US007157399B2

(12) United States Patent
Sonnenschein et al.

(10) Patent No.: US 7,157,399 B2
(45) Date of Patent: Jan. 2, 2007

(54) AMINE ORGANOBORANE COMPLEX INITIATED POLYMERIZABLE COMPOSITIONS CONTAINING SILOXANE POLYMERIZABLE COMPONENTS

(75) Inventors: Mark F. Sonnenschein, Midland, MI (US); Steven P. Webb, Midland, MI (US); Benjamin L. Wendt, Midland, MI (US); Daniel R. Harrington, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 393 days.

(21) Appl. No.: 10/864,668

(22) Filed: Jun. 9, 2004

(65) Prior Publication Data
US 2004/0242812 A1 Dec. 2, 2004

Related U.S. Application Data

(62) Division of application No. 10/377,440, filed on Feb. 28, 2003, now Pat. No. 6,777,512.

(51) Int. Cl.
B01J 31/00 (2006.01)
C08F 5/02 (2006.01)

(52) U.S. Cl. ............ 502/162; 502/170; 502/200; 502/202; 526/196; 526/134; 526/141; 526/279; 564/1; 564/8; 564/9

(58) Field of Classification Search ............ 502/162, 502/170, 200, 202; 526/196, 134, 141, 279; 564/1, 8, 9
See application file for complete search history.

(56) References Cited

U.S. PATENT DOCUMENTS

| 3,275,611 A | 9/1966 | Mottus et al. ............ 260/80.5 |
| 3,527,737 A | 9/1970 | Masuhara et al. ......... 260/78.5 |
| 3,819,447 A | 6/1974 | Dalibor et al. ............ 156/330 |
| 3,971,751 A | 7/1976 | Isayama et al. ........... 260/37 R |
| 4,344,800 A | 8/1982 | Lutz ........................ 106/308 Q |
| 4,385,153 A | 5/1983 | Ritter ....................... 524/522 |
| 4,426,243 A | 1/1984 | Briggs ..................... 156/307.3 |
| 4,448,927 A | 5/1984 | Falender et al. ........... 524/860 |
| 4,515,724 A | 5/1985 | Ritter ....................... 260/410 |
| 4,538,920 A | 9/1985 | Drake ....................... 366/177 |
| 4,552,604 A | 11/1985 | Green ....................... 156/246 |
| 4,676,858 A | 6/1987 | Ritter ....................... 156/307 |
| 4,705,838 A | 11/1987 | Goel ......................... 528/48 |
| 4,746,725 A | 5/1988 | Evans et al. ............... 528/370 |
| 4,788,254 A | 11/1988 | Kawakubo et al. ......... 525/100 |
| 4,823,927 A | 4/1989 | Jensen ..................... 193/35 SS |
| 4,920,188 A | 4/1990 | Sakashita .................. 526/196 |
| 4,921,921 A | 5/1990 | Ritter ....................... 526/195 |
| 4,923,927 A | 5/1990 | Hirose et al. .............. 525/100 |
| 4,985,477 A | 1/1991 | Collins et al. ............. 523/212 |
| 4,985,516 A | 1/1991 | Sakashita et al. .......... 526/196 |
| 5,034,464 A | 7/1991 | Arduengo ................. 525/207 |
| 5,082,147 A | 1/1992 | Jacobs ...................... 222/137 |
| 5,106,928 A | 4/1992 | Skoultchi et al. ........... 526/196 |
| 5,143,884 A | 9/1992 | Skoultchi et al. ........... 502/160 |
| 5,204,386 A | 4/1993 | Ersun-Hallsby et al. .... 423/443 |
| 5,223,597 A | 6/1993 | Iwakiri et al. .............. 528/31 |
| 5,250,228 A | 10/1993 | Baigrie et al. ............. 252/511 |
| 5,286,821 A | 2/1994 | Skoultchi .................. 526/196 |
| 5,310,835 A | 5/1994 | Skoultchi et al. ........... 526/198 |
| 5,344,890 A | 9/1994 | Miyazono et al. ......... 525/326.5 |
| 5,376,746 A | 12/1994 | Skoultchi .................. 526/196 |
| 5,401,805 A | 3/1995 | Chung et al. .............. 525/288 |
| 5,404,805 A | 4/1995 | Fujimoto et al. ........... 101/118 |
| 5,409,995 A | 4/1995 | Iwahara et al. ............ 525/100 |
| 5,420,223 A | 5/1995 | Johnson ................... 528/91 |
| 5,527,578 A | 6/1996 | Mazurek et al. ........... 428/41.8 |
| 5,539,070 A | 7/1996 | Zharov et al. ............. 526/198 |
| 5,567,833 A | 10/1996 | Iwahara et al. ............ 556/434 |
| 5,599,856 A | 2/1997 | Gardner ................... 523/453 |
| 5,616,796 A | 4/1997 | Pocius et al. .............. 564/9 |
| 5,621,143 A | 4/1997 | Pocius ..................... 564/8 |

(Continued)

FOREIGN PATENT DOCUMENTS

EP 0159683 4/1985

(Continued)

OTHER PUBLICATIONS

Journal of Applied Polymer Science, vol. 43, (1991) pp. 2115-2121"Grafting of Methyl Methacrylate onto Silk Fibers Initiated by Tri-*n*-Butylborane" M. Tsukada, et al.

(Continued)

Primary Examiner—Robert D. Harlan
(74) Attorney, Agent, or Firm—Norman L. Sims

(57) ABSTRACT

In one embodiment the invention is a polymerizable composition comprising a) an organoborane amine complex; b) one or more of monomers, oligomers or polymers having olefinic unsaturation which is capable of polymerization by free radical polymerization; c) one or more compounds, oligomers or prepolymers having a siloxane backbone and reactive moieties capable of polymerization; and d) a catalyst for the polymerization of the one or more compounds, oligomers or prepolymers having a siloxane backbone and reactive moieties capable of polymerization. This composition may further comprise a compound which causes the organoborane amine complex to disassociate. In a preferred embodiment, the two part composition further comprises a compound which is reactive with both the b) one or more of monomers, oligomers or polymers having olefinic unsaturation which is capable of polymerization by free radical polymerization; and the c) one or more compounds, oligomers or prepolymers having a siloxane backbone and reactive moieties capable of polymerization. This composition can be polymerized by contacting the two parts of the composition. In another embodiment the invention is an organoborane amine complex comprising an alkyl borane having ligands which are alkyl, cycloalkyl or both and an amino siloxane.

6 Claims, No Drawings

U.S. PATENT DOCUMENTS

| | | | |
|---|---|---|---|
| 5,674,941 A | 10/1997 | Cho et al. | 525/102 |
| 5,679,458 A | 10/1997 | Cho et al. | 428/412 |
| 5,681,910 A | 10/1997 | Pocius | 526/198 |
| 5,684,102 A | 11/1997 | Pocius et al. | 526/198 |
| 5,686,544 A | 11/1997 | Pocius | 526/196 |
| 5,690,780 A | 11/1997 | Zharov et al. | 156/332 |
| 5,691,065 A | 11/1997 | Zharov et al. | 428/421 |
| 5,705,561 A | 1/1998 | Kozakiewicz et al. | 524/730 |
| 5,718,977 A | 2/1998 | Pocius | 428/422 |
| 5,721,281 A | 2/1998 | Blount | 521/50 |
| 5,795,657 A | 8/1998 | Pocius et al. | 428/516 |
| 5,807,910 A | 9/1998 | Tseng et al. | 523/428 |
| 5,817,376 A | 10/1998 | Everaerts et al. | 427/483 |
| 5,837,155 A | 11/1998 | Inagaki et al. | 216/18 |
| 5,859,155 A | 1/1999 | Furihata et al. | 525/531 |
| 5,872,197 A | 2/1999 | Deviny | 526/192 |
| 5,883,208 A | 3/1999 | Deviny | 526/198 |
| 5,912,433 A | 6/1999 | Pulido | 174/77 |
| 5,935,711 A | 8/1999 | Pocius et al. | 428/421 |
| 5,948,854 A | 9/1999 | de Buyl et al. | 524/788 |
| 5,952,409 A | 9/1999 | Boardman et al. | 524/185 |
| 5,990,036 A | 11/1999 | Deviny | 502/162 |
| 5,994,484 A | 11/1999 | Pocius | 526/196 |
| 6,001,928 A | 12/1999 | Harkness et al. | 524/858 |
| 6,008,284 A | 12/1999 | Nylund et al. | 524/425 |
| 6,008,308 A | 12/1999 | Pocius | 526/196 |
| 6,027,813 A | 2/2000 | Deviny | 428/422 |
| 6,054,548 A | 4/2000 | Currie et al. | 528/23 |
| 6,090,904 A | 7/2000 | Körner et al. | 528/34 |
| 6,093,778 A | 7/2000 | Pocius | 526/196 |
| 6,207,781 B1 | 3/2001 | Halloran et al. | 528/14 |
| 6,252,023 B1 | 6/2001 | Moren | 526/196 |
| 6,255,362 B1 | 7/2001 | Ito | 523/107 |
| 6,706,831 B1 | 3/2004 | Sonnenschein et al. | 526/196 |
| 6,710,145 B1 | 3/2004 | Sonnenschein et al. | 526/196 |
| 6,713,578 B1 | 3/2004 | Sonnenschein et al. | 526/196 |
| 6,713,579 B1 | 3/2004 | Sonnenschein et al. | 526/196 |
| 6,730,759 B1 | 5/2004 | Sonnenschein et al. | 526/196 |
| 6,740,716 B1 | 5/2004 | Webb et al. | 526/196 |
| 6,762,260 B1 | 7/2004 | Sonnenschein et al. | 526/196 |
| 6,806,330 B1 | 10/2004 | Sonnenschein et al. | 526/196 |
| 2004/0082743 A1 | 4/2004 | Sonnenschein et al. | 526/217 |

FOREIGN PATENT DOCUMENTS

| | | |
|---|---|---|
| EP | 0 651 002 A2 | 5/1995 |
| WO | 96/19179 | 6/1996 |
| WO | 97/07171 | 2/1997 |
| WO | 98/17694 | 4/1998 |
| WO | 01/44311 A1 | 6/2001 |

OTHER PUBLICATIONS

Journal of Polymer Science, vol. 6, Pt. 2, (1968) pp. 3157-3162 "Vinyl Monomer Polymerization Mechanism in the Presence of Trialkylboranes" J. Grotewold, et al.

Chemical Abstracts, Fujisawa, Seiichiro et al., "Dental Self-Curing Resins. XI. Characterization of Several Complexes of tri-*n*-butyl Borane as an Initiator" 73:88532, XP002160417-Abstract & Iyo Kizai Kenkyusho Hokoku, Tokyo Ika Kizai Kenkyusho Hokoku, Tokyo Ika Shika Daigaku (1969), 3, 64-71.

Love, Peter et al., "Polar Substituent Effects in Gas-Phase Lewis Acid-Base Equilibria. I. Intrinsic Basicity of Amines", J. Amer. Chem. Soc. (1968), 90(10), 2455-62, XP000982168, tables 1. Ext.. col. 4 and 5.

Koester, Roland, et a., "Boron compounds. XXVII. Bortlation of several amino carboxylic acids", Justus Leibigs Ann, Chem. (1974), (1), 112-19 XP000982170, (No translation provided).

ZH. Obshch. Khim., Dorokhov et al., 1976, 46(5), pp. 1053-1059.

Journal of Organometallic Chemistry, Hoberg et al., 1976, 118(1), C3-C5 (no translation provided).

Journal of Polymer Science, vol. 61, (1962) pp. 241-261, Bailey.

Derwent AN 1996-484098, SU 1457392A1, Dodonov et al.

Derwent AN 1997-010377, SU 1609117A1, Dodonov et al.

Derwent, 99-010842/02, DE 19738208-A1, Tseng T. et al.

Derwent 87-331368/47, J62236-878-A, Sumitomo Elec Ind. KK.

Derwent 88-202092/29, J63139-969-A, Kanegafuchi Chem KK.

Derwent AN 1997-064052, SU 162491A1, Dodonov et al.

Journal of Applied Polymer Science, vol. 10, (1966), pp. 523-534, Proposed Mechanism for the Curing of Epoxy Resins with Amine-Lewis Acid Complexes or Salts, Harris et al.

Plastics Technical Section, Dr. Gordon M. Kline, pp. 149, 150, 152, 154, 155, 158, 160, 186 (1964).

Modern Synthetic Reactions, Herbert O. House, pp. 786 (1972).

Chemical Abstracts, vol. 119, 1983, p. 78, 119:74163c Acrylic Adhesive Composition and Organoborane Initiator System.

Derwent Abstract, 96-453820/45, ADGE=93.05.28, Adgeziv Co. Ltd., RU 2054022-C1.

Derwent 92-085634/11, J04029-393-A, Shinetsu Chem Ind KK.

Derwent 92-289585/35, JP04199694-A, Shinetsu Chem Ind Co Ltd.

Derwent 94-164114/20, JP06107907-A, Nippon Zeon KK.

Derwent 95-041525/06, JP069322324-A, Shinetsu Chem Ind Co Ltd.

Derwent 95-049086/07, JP06330015-A, Nissan Motor Co Ltd.

Derwent 97-529863/49, JP09208921-A, Shinetsu Chem Ind Co Ltd.

Chemical Abstract, 128:218101s, Acrylic Adhesive Compositions, Kimura, JP 10-046,125.

Derwent 98-189554/17, JP10046126-A, Nippon Synthetic Chem Ind Co.

Derwent 98-343543/30, JP10130612-A, Nippon Synthetic Chem Ind Co.

Derwent 98-357757/31, JP10140119-A, Nippon Synthetic Chem Ind Co.

Derwent 99-283642/24, JP11092593-A, Hitachi Chem Co. Ltd.

Chemical Abstract 116:195541w, Epoxy resin binder for commutator sheet mica, Ivanilova et al.

Derwent 84-159009/26, DD207436-A, Veb Filmfab Wolfen.

Derwent 90-332394/44, J02240130-A, Denki Kagaku Kogyo KK.

Derwent 1985-301176/48, SU 1155607, Kirakosyan, KII A.

Derwent 1990-332395/44, JP 02-240,131, Denki Kagaku Kogyo KK.

Derwent 96-453820/45, RU2054022-C1, Adgeziv Co. Ltd.

Polymer Letters, vol. 8, pp. 541-547 (1970) Polymerization of Methyl Methacrylate by Trialkylborane-Pyridine System.

AMINE ORGANOBORANE COMPLEX INITIATED POLYMERIZABLE COMPOSITIONS CONTAINING SILOXANE POLYMERIZABLE COMPONENTS

This application is a divisional of U.S. patent application Ser. No. 10/337,440, filed Feb. 28, 2003, now U.S. Pat. No. 6,777,512.

BACKGROUND OF THE INVENTION

This invention relates to organoborane amine initiated polymerizable compositions that contain siloxane polymerizable components. The polymerizable compositions comprise compounds containing moieties capable of flee radical polymerization and polymerizable compounds containing siloxane. In another embodiment the invention relates to adhesives, sealants, and coatings containing organoborane amine complexes and compounds containing moieties capable of free radical polymerization and polymerizable compounds containing siloxane backbones. Another embodiment of this invention are organoborane amine complexes in which the amine has siloxane functionality. Another embodiment of this invention relates to polymerizable compositions comprising compounds containing moieties capable of free radical polymerization and organoborane amine complex initiators and silicone containing materials capable of producing acid upon exposure to moisture allowing for the polymerizable composition to be stable in a one-part formulation in the absence of moisture.

In many practical situations in which compounds are subjected to polymerization, for instance where the polymerizable compounds are used as adhesives, it is desirable to have polymerizable compositions and adhesive compositions that can cure on demand, by performing an operation such as heating, shearing or contacting two or more components containing reactive materials. Cure on demand means that the polymerization can be initiated when desired. A significant problem with cure on demand compositions is the stability of the compositions. Many such compositions at, or near, ambient temperature will cure partially resulting in an increased viscosity causing difficulties in handling and reduced functionality of the polymerizable composition or adhesive composition.

Low surface energy olefins such as polyethylene, polypropylene and polytetrafluroethylene have a variety of attractive properties in a variety of uses, such as toys, automobile parts, furniture applications and the like. Because of the low surface energy of these plastic materials, it is very difficult to find adhesive compositions that bond to these materials. The commercially available adhesives that are used for these plastics require time consuming or extensive pretreatment of the surface before the adhesive will bond to the surface. Such pretreatments include corona treatment, flame treatment, the application of primers, and the like. The requirement for extensive pretreatment of the surface results in significant limitations to the designers of automobile components, toys, furniture and the like.

A series of patents issued to Skoultchi (U.S. Pat. Nos. 5,106,928; 5,143,884; 5,286,821; 5,310,835 and 5,376,746 (all incorporated herein by reference)) disclose a two-part initiator system that is useful in acrylic adhesive compositions. The first part of the two-part system includes a stable organoborane amine complex and the second part includes a destabilizer or activator such as an organic acid or an aldehyde. The organoborane compound of the complex has three ligands which can be selected from $C_{1-10}$ alkyl groups or phenyl groups. The adhesive compositions are disclosed to be useful in structural and semi-structural adhesive applications, such as speaker magnets, metal to metal bonding, automotive glass to metal bonding, glass to glass bonding, circuit board component bonding, bonding select plastics to metal, glass to wood, etc. and for electric motor magnets.

Zharov, et al. discloses in a series of U.S. Pat. Nos. (5,539,070; 5,690,780; and U.S. Pat. No. 5,691,065 (all incorporated herein by reference)) polymerizable acrylic compositions which are particularly useful as adhesives wherein organoborane amine complexes are used to initiate cure. It is disclosed that these complexes are good for initiating polymerization of an adhesive that bonds to low surface energy substrates.

Pocius in a series of patents (U.S. Pat. Nos. 5,616,796; 5,621,143; 5,681,910; 5,686,544; 5,718,977; and 5,795,657 (all incorporated herein by reference)) disclose amine organoborane complexes using a variety of amines such as polyoxyalkylene polyamines and polyamines which are the reaction product of diprimary amines and compound having at least two groups which react with a primary amines. Pocius (U.S. Pat. No. 5,686,544) discloses a composition comprising an organoborane polyamine complex, polyol and an isocyanate decomplexing agent.

After polymerization many of the compositions of the prior art demonstrate excellent stability, strength, and adhesion at or near ambient temperatures, but at temperatures above and below room temperature undergo significant loss of strength and adhesion due to softening at temperatures above the adhesive's Tg and embrittlement at temperatures below the Tg of the adhesive matrix. This limits the environments where substrates bonded using these adhesives can be used.

Therefore, there is a need for adhesive systems which are capable of bonding to low surface energy substrates, and initiator systems which facilitate such bonding. What are further needed are polymer compositions and adhesive systems which are thermally stable at, or near, ambient temperatures and which will undergo polymerization when the user desires. Also needed are adhesive compositions which are capable of bonding to low surface energy substrates, and bonding low surface energy substrates to other substrates, without the need for extensive or costly pretreatment. Compositions that have stability and adhesion at temperatures different from ambient are also desired.

SUMMARY OF INVENTION

In one embodiment the invention is a polymerizable composition comprising a) an organoborane amine complex; b) one or more of monomers, oligomers or polymers having olefinic unsaturation which is capable of polymerization by free radical polymerization; c) one or more compounds, oligomers or prepolymers having a siloxane backbone and reactive moieties capable of polymerization; and d) a catalyst for the polymerization of the one or more compounds, oligomers or prepolymers having a siloxane backbone and reactive moieties capable of polymerization. Some of the compositions of the invention can be polymerized by exposure to temperatures at which the organoborane amine complex undergoes disassociation and initiates polymerization of the reactive compounds, oligomers or prepolymers.

In another embodiment the invention is a two part polymerizable composition comprising a) an organoborane amine complex; b) one or more of monomers, oligomers or polymers having olefinic unsaturation which is capable of polymerization by free radical polymerization; c) one or more compounds, oligomers or prepolymers having siloxane in the backbone and reactive moieties capable of polymerization, d) an effective amount of a compound that causes the organoborane amine complex to disassociate, freeing the borane to initiate polymerization of the one or more monomers, oligomer-s or polymers having olefinic unsaturation; and e) a catalyst for the polymerization of the one or more compounds, oligomers or prepolymers having a siloxane backbone and reactive moieties capable of polymerization.

The compound that causes disassociation of the complex is kept separate from the complex until initiation of polymerization is desired. It may be desirable to keep catalyst components used in the composition separate from portions of the composition with which they may react under normal storage or transport conditions for instance, in separate parts of a two part composition.

In a preferred embodiment, the two part composition further comprises a compound which is reactive with both the b) one or more of monomers, oligomers or polymers having olefinic unsaturation which is capable of polymerization by free radical polymerization; and the c) one or more compounds, oligomers or prepolymers having a siloxane backbone and reactive moieties capable of polymerization. This composition can be polymerized by contacting the two parts of the composition.

In another embodiment the invention is an organoborane amine complex comprising an alkyl borane having ligands which are alkyl, cycloalkyl or both and an amino siloxane.

In yet another embodiment the invention is a polymerizable composition comprising a) an organoborane amine complex; b) one or more of monomers, oligomers or polymers having olefinic unsaturation which is capable of polymerization by free radical polymerization; and c) a compound which has siloxane groups in its backbone and contains a moiety which when exposed to moisture releases an acid capable of decomplexing the organoborane amine complex. This composition can be polymerized by exposing the composition to atmospheric moisture under conditions such that part c) decomposes to form an acid, which causes the organoborane amine complex to disassociate and initiate polymerization.

The polymerizable compositions of the invention are stable at, or near, ambient temperature and can be cured upon demand by contacting the two parts of the composition, or alternatively by heating the composition above the thermal disassociation temperature of the organoborane amine complex. Furthermore, the polymerizable compositions of the invention can form bonds to low surface energy substrates without the need for primers or surface treatment. These polymerizable compositions can be used as adhesives, coatings or to laminate substrates together. The polymerized compositions may also demonstrate excellent cohesive and adhesive strength at elevated temperatures and thus demonstrate excellent stability at high temperatures. The compositions of the invention also exhibit excellent properties at a wide range of temperatures including at low temperatures, for instance down to −40° C.

DETAILED DESCRIPTION OF THE INVENTION

The organoborane used in the complex is a trialkyl borane or an alkyl cycloalkyl borane. Preferably such borane corresponds to Formula 1:

$$B-(R^2)_3$$

wherein B represents Boron; and $R^2$ is separately in each occurrence a $C_{1-10}$ alkyl, $C_{3-10}$ cycloalkyl, or two or more of $R^2$ may combine to form a cycloaliphatic ring. Preferably $R^2$ is $C_{1-4}$ alkyl, even more preferably $C_{2-4}$ alkyl, and most preferably $C_{3-4}$ alkyl. Among preferred organoboranes are tri-ethyl borane, tri-isopropyl borane and tri-n-butylborane.

The amines used to complex the organoborane compound can be any amine or mixture of amines which complex the organoborane and which can be decomplexed when exposed to a decomplexing agent. The desirability of the use of a given amine in an amine/organoborane complex can be calculated from the energy difference between the Lewis acid-base complex and the sum of energies of the isolated Lewis acid (organoborane) and base (amine) known as binding energy. The more negative the binding energy the more stable the complex.

Binding Energy=(Complex Energy−(Energy of Lewis Acid+Energy of Lewis base))

Such binding energies can be calculated using theoretical ab-initio methods such as the Hartree Fock method and the 3–21 G basis set. These computational methods are available commercially employing commercial software and hardware such as SPARTAN and Gaussian 98 programs with a Silicon Graphics workstation. Amines having amine/organoborane binding energies of 10 kilocalories per mol or greater are preferred, amines having a binding energy of 15 kilocalories per mol or greater are more preferred and even more preferred are amines with a binding 20 kilocalories per mol or greater are most preferred. In the embodiment where polymerization of the compositions of the invention is initiated by use of a decomplexing agent the binding energy of the amine to the organoborane is preferably about 50 kcal/mole or less and most preferably about 30 kcal/mole or less. In the embodiment where polymerization of the compositions of the invention is initiated by use of heat, the binding energy of the amine is preferably about 100 kcal/mole or less, more preferably about 80 kcal/mole or less and most preferably about 50 kcal/mole or less.

Preferred amines include the primary or secondary amines or polyamines containing primary or secondary amine groups, or ammonia as disclosed in Zharov U.S. Pat. No. 5,539,070 at column 5, lines 41 to 53, incorporated herein by reference, Skoultchi U.S. Pat. No. 5,106,928 at column 2, line 29 to 58, incorporated herein by reference, and Pocius U.S. Pat. No. 5,686,544 at column 7, line 29 to Column 10 line 36, incorporated herein by reference; ethanolamine, secondary dialkyl diamines or polyoxyalkylenepolyamines; and amine terminated reaction products of diamines and compounds having two or more groups reactive with amines as disclosed in Deviny U.S. Pat. No. 5,883,208 at column 7, line 30 to column 8 line 56, incorporated herein by reference. With respect to the reaction products described in Deviny the preferred diprimary amines include alkyl diprimary amines, aryl diprimary amines, alkyaryl diprimary amines and polyoxyalkylene diamines; and compounds reactive with amines include compounds which contain two or more moieties of carboxylic acids, carboxylic acid esters, carboxylic acid halides, aldehydes, epoxides, alcohols and acrylate groups. Preferred amines described in Deviny include n-octylamine, 1,6-diaminohexane (1,6-hexane diamine), diethylamine, dibutyl amine, diethylene triamine, dipropylene diamines, 1,3-propylene diamine (1,3-propane diamine), 1,2-propylene diamine, 1,2-ethane diamines, 1,5-pentane diamine, 1,12-dodecanediamine, 2-methyl-1,5-pentane diamines, 3-methyl-1,5-pentane diamine, triethylene and tetraamine and diethylene triamine. Preferred polyoxyalkylene polyamines include polyethyleneoxide diamines, polypropyleneoxide diamines, triethylene glycol propylene diamine, polytetramethyleneoxide diamine and polyethyleneoxidecopolypropyleneoxide diamines.

In one preferred embodiment, the amines comprises a compound having a primary amine and one or more hydrogen bond accepting groups, wherein there are at least two carbon atoms, preferably at least about three, between the primary amine and hydrogen bond accepting groups. Preferably, an alkylene moiety is located between the primary amine and the hydrogen bond accepting group. Hydrogen bond accepting group means herein a functional group that through either inter- or intramolecular interaction with a hydrogen of the borane-complexing amine increases the electron density of the nitrogen of the amines group complexing with the borane. Preferred hydrogen bond accepting groups include primary amines, secondary amines, tertiary amines, ethers, halogen, polyethers, thioethers and polyamines. In a preferred embodiment, the amine corresponds to Formula 2:

$$NH_2(CH_2)_b\text{-}(C(R^1)_2)_a\text{-}X \qquad \text{Formula 2}$$

wherein:

$R^1$ is separately in each occurrence hydrogen, a $C_{1-10}$ alkyl, $C_{3-10}$ cycloalkyl or two or more of $R^1$ can form a cyclic ring structure which may have one or more cyclic rings;

X is hydrogen bond accepting moiety; a is separately in each occurrence an integer of about 1 to about 10; and b is an integer of about 0 to about 1, and the sum of a and b is separately in each occurrence from about 2 to about 10. Preferably $R^1$ is hydrogen, methyl or two or more of $R^1$ combine to form a 5 or 6 membered cyclic ring. In a preferred embodiment X is a hydrogen bond accepting moiety with the proviso that when the hydrogen bond accepting moiety is an amines it is a tertiary or a secondary amines. Preferably the hydrogen bond accepting group has one or more nitrogen, oxygen, sulfur or halogen atoms in the group. More preferably X is separately in each occurrence $-N(R^8)_2$, $-OR^{10}$, $-SR^{10}$ or a halogen. $R^8$ is separately in each occurrence hydrogen, $C_{1-10}$ alkyl, $C_{3-10}$ cycloalkyl, $-(C(R^1)_2)_d\text{-}W$ or two of $R^8$ may combine to form a structure having one or more cyclic rings. $R^{10}$ is separately in each occurrence hydrogen, $C_{1-10}$ alkyl, $C_{3-10}$ cycloalkyl, or $-(C(R^1)_2)_d\text{-}W$. More preferably X is $-N(R^8)_2$ or $-OR^{10}$. Preferably, $R^8$ and $R^{10}$ are separately in each occurrence hydrogen, $C_{1-4}$ alkyl or $-(C(R^1)_2)_d\text{-}W$, more preferably hydrogen, $C_{1-4}$ alkyl and most preferably hydrogen or methyl. W is separately in each occurrence hydrogen or $C_{1-10}$ alkyl or X and more preferably hydrogen or $C_{1-4}$ alkyl. Where W is X, this represents that the hydrogen bond accepting group has more than one hydrogen bond accepting moiety as described herein. Preferably, a is about 1 or greater and more preferably about 2 or greater. Preferably a is about 6 or less, and most preferably about 4 or less. Preferably, b is about 1. Preferably, the sum of a and b is an integer about 2 or greater and most preferably about 3 or greater. Preferably the sum of a and b are separately in each occurrence about 6 or less and more preferably about 4 or less. Preferably d is separately in each occurrence an integer of about 1 to about 4, more preferably about 2 to about 4, and most preferably about 2 to about 3. Among preferred amines corresponding to Formula 2 are dimethylaminopropyl amine, methoxypropyl amine, dimethylaminoethylamine, dimethylaminobutylamine, methoxybutyl amine, methoxyethyl amine, ethoxypropylamine, propoxypropylamine, amine terminated polyalkylene ethers (such as trimethylolpropane tris(poly(propyleneglycol), amine terminated) ether), and aminopropylpropanediamine.

In one embodiment the preferred amine complex corresponds to Formula 3:

$$(R^2)_3B\leftarrow NH_2(CH_2)_b\text{-}(C(C(R^1)_2)_a\text{-}X \qquad \text{Formula 3}$$

wherein $R^1$, $R^2$, X, a and b are as defined hereinbefore.

In another embodiment the amine is an aliphatic heterocycle having at least one nitrogen in the heterocycle. The heterocyclic compound may also contain one or more of nitrogen, oxygen, sulfur or double bonds. In addition, the heterocycle may comprise multiple rings wherein at least one of the rings has nitrogen in the ring. Preferably the aliphatic heterocyclic amine corresponds to Formula 4:

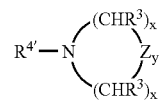

Formula 4 wherein:

$R^3$ is separately in each occurrence hydrogen, a $C_{1-10}$ alkyl, $C_{3-10}$ cycloalkyl or forms a double bond with an adjacent atom. $R^4$ is separately in each occurrence hydrogen, $C_{1-10}$ alkyl or forms a cyclic ring with an $R^3$, Z or a substituent on Z. Z is separately in each occurrence sulfur, oxygen or $-NR^4$. $R^4$ is separately in each occurrence hydrogen, $C_{1-10}$ alkyl, $C_{6-10}$ aryl, $C_{7-10}$ alkaryl. 'x' is separately in each occurrence an integer of about 1 to about 10, with the proviso that the total of all occurrences of x should be from about 2 to about 10. 'y' is separately in each occurrence 0 or 1. Two or more of $R^3$, $R^4$, and $R^4$ may combine to form cyclic rings thereby forming a multicyclic compound. Preferably, $R^3$ is separately in each occurrence hydrogen, methyl or forms a double bond with an adjacent atom. Preferably Z is $NR^4$. Preferably, $R^4$ is hydrogen or $C_{1-4}$ alkyl, and more preferably hydrogen or methyl. Preferably, $R^4$ is hydrogen or $C_{1-4}$ alkyl, more preferably hydrogen or methyl and most preferably hydrogen. Preferably x is from about 1 to about 5, inclusive, and the total of all the occurrences of x is about 3 to about 5. Preferred compounds corresponding to Formula 4 include morpholine, piperidine, pyrolidine, piperazine, 1,3,3 trimethyl 6-azabicyclo[3,2,1] octane, thiazolidine, homopiperazine, aziridine, 1-amino-4-methylpiperazine, 3-pyrroline, aminopropyl morpholine and the like. Complexes containing aliphatic heterocyclic amines preferably correspond to Formula 5:

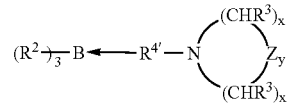

Formula 5 wherein $R^2$, $R^3$, $R^4$, Z, x and y are as defined hereinbefore.

In yet another embodiment, the amine which is complexed with the organoborane is an amidine. Any compound with amidine structure wherein the amidine has sufficient binding energy as described hereinbefore with the organoborane, may be used. Preferable amidine compounds correspond to Formula 6:

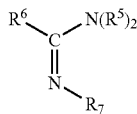

Formula 6 wherein:

$R^5$, $R^6$, and $R^7$ are separately in each occurrence hydrogen, a $C_{1-10}$ alkyl or $C_{3-10}$ cycloalkyl; two or more of $R^5$, $R^6$, and $R^7$ may combine in any combination to form a ring structure, which may have one or more rings. Preferably $R^5$, $R^6$ and $R^7$ are separately in each occurrence hydrogen, $C_{1-4}$ alkyl or $C_{5-6}$ cycloalkyl. Most preferably $R^7$ is H or methyl. In the embodiment where two or more of $R^5$, $R^6$ and $R^7$ combine to form a ring structure the ring structure is preferably a single or a double ring structure. Among preferred amidines are 1,8 diazabicyclo[5,4]undec-7-ene; tetrahydropyrimidine; 2-methyl-2-imidazoline; and 1,1,3,3-tetramethylguanidine, and the like.

The organoborane amidine complexes preferably correspond to Formula 7: wherein $R^2$, $R^5$, $R^6$ and $R^7$ are as defined earlier.

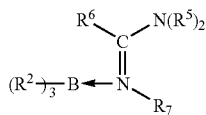

Formula 7

In yet another embodiment, the amine that is complexed with the organoborane is a conjugated imine. Any compound with a conjugated imine structure, wherein the imine has sufficient binding energy as described hereinbefore with the organoborane, may be used. The conjugated imine can be a straight or branched chain imine or a cyclic imine. Preferable imine compounds correspond to Formula 8:

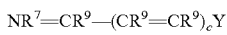

Formula 8 wherein $R^7$ is hydrogen, alkyl or forms a ring with $R^9$ or Y. Y is independently in each occurrence hydrogen, $N(R^4)_2$, $OR^4$, $C(O)OR^4$, halogen, an alkylene group which forms a cyclic ring with $R^7$ or $R^9$. $R^9$ is independently in each occurrence hydrogen, Y, $C_{1-10}$ alkyl, $C_{3-10}$ cycloalkyl-, $(C(R^9)_2)$—$(CR^9=CR^9)_c$—Y or two or more of $R^9$ can combine to form a ring structure provided the electron rich group in Y is conjugated with respect to the double bond of the imine nitrogen; and c is separately in each occurrence an integer of from about 1 to about 10. Preferably, $R^9$ is separately in each occurrence hydrogen or methyl. Y is preferably $N(R^4)_2$, $SR^4$, $OR^4$, or an alkylene group which forms a cyclic ring with $R^9$. Y is more preferably $N(R^4)_2$ or an alkylene group which forms a cyclic ring with $R^9$. Preferably, c is an integer of from about 1 to about 5, and most preferably about 1. Among preferred conjugated imines useful in this invention are 4-dimethylaminopyridine; 2,3-bis(dimethylamino) cyclopropeneimine; 3-(dimethylamino)acroleinimine; 3-(dimethylamino)methacroleinimine, and the like.

Among preferred cyclic imines are those corresponding to the following structures

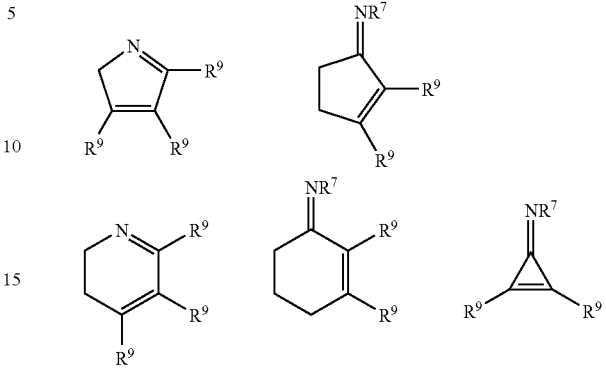

The complexes with the conjugated imines preferably correspond to Formula 9:

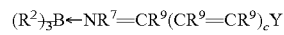

wherein $R^2$, $R^7$, $R^9$, c and Y are as defined hereinbefore.

In another embodiment the amine can be an alicyclic compound having bound to the alicyclic ring a substituent containing an amine moiety. The amine containing alicyclic compound may have a second substituent that contains one or more nitrogen, oxygen, sulfur atoms or a double bond. The alicyclic ring can contain one or two double bonds. The alicyclic compound may be a single or multiple ring structure. Preferably the amine on the first substituent is primary or secondary. Preferably the alicyclic ring is a 5 or 6 membered ring. Preferably functional groups on the second substituent, X, are amines, ethers, thioethers or halogens. In a preferred embodiment the alicyclic compound with one or more amines containing substituent corresponds to Formula 10

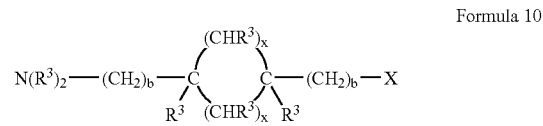

Formula 10 wherein $R^3$, X, b and x are as described hereinbefore. Included in amine substituted alicyclic compounds is isophorone diamine and isomers of bis(aminoethyl) cyclohexane.

Complexes using amine substituted alicyclic compounds correspond to Formula 11

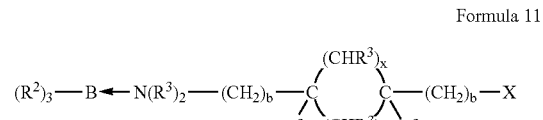

Formula 11 wherein $R^2$, $R^3$, X, b and x are as defined hereinbefore.

In another preferred embodiment the amine further contains siloxane, that is an amino siloxane. Any compound with both amine and siloxane units wherein the amine has sufficient binding energy as described hereinbefore with the organoborane, may be used. Preferably the siloxane moiety will permit this component to participate in polymerization of the siloxane monomers, oligomers, and/or polymers. The siloxane containing monomers, oligomers, and/or polymers can be any compound which contains silicone. Preferably the siloxane compound has reactive functionality. Preferable reactive functionalities include hydride, olefinic unsaturation, hydroxyl, and hydrolyzable moieties that hydrolyze to form a silanol moiety. A preferred embodiment of the formulation will have the following general formula

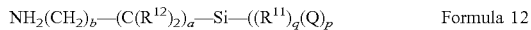  Formula 12

Q is a hydrolyzable moiety. Preferably Q is separately in each occurrence a hydrogen atom, a halogen atom, an alkoxy group, an acyloxy group, a ketoximate group, an amino group, an amido group, an acid amido group, an amino-oxy group, a mercapto group, or an alkenyloxy group. Preferred among hydrolyzable groups are a hydrogen atom, an alkoxy group, an acyloxy group, a ketoximate group, an amino group, an amido group, an amino-oxy group, a mercapto group, and an alkenyloxy group. An alkoxy group is more preferred with a methoxy or ethoxy group being most preferred, for ease in handling due to its mild hydrolyzablility. Preferably Q is —$OR^{13}$ wherein $R^{13}$ is separately in each occurrence alkyl or hydrogen. Preferably $R^{13}$ is lower C alkyl, even more preferably ethyl or methyl and most preferably methyl. $R^{11}$ is independently in each occurrence hydrogen, alkyl, alkoxy, alkenyl, alkyl amino or corresponds to the formula $((CR^{14}H)_rO)_n$—$(NR^4)_b$—$(CH_2)_o$-$NH_2$, with the proviso that at least one $R^{11}$ contains a primary amine. In Formula 12, $R^4$ is preferably hydrogen or a $C_{1-10}$alkyl group. More preferably, $R^{11}$ is separately in each occurrence $C_{1-10}$alkyl, $C_{2-20}$vinyl terminated alkenyl or corresponds to the formula $((CR^{14}H)_rO)_n$—$(NR^4)_b$—$(CH_2)_o$-$NH_2$ and most preferably $C_{1-4}$alkyl, $C_{2-8}$ alkenyl or corresponds to the formula $((CR^{14}H)_rO)_n$—$(NR^4)_b$—$(CH_2)_o$—$NH_2$. In the embodiment where $R^{11}$ is alkenyl, the unsaturation is preferably located on a terminal carbon. $R^{12}$ is independently in each occurrence H, alkyl, aryl, alkoxy, and may further contain one or more primary, secondary or tertiary amines. In the embodiment where $R^{12}$ is alkoxy, secondary or tertiary amines, the compounds described by Formula 12 may undergo intramolecular hydrogen bonding similar to compound described by Formula 2. This allows the potential for higher stability complexes to form. Preferably, $R^{12}$ is separately in each occurrence hydrogen, $C_{1-20}$ alkyl, $C_{2-20}$ aryl or $C_{1-20}$ alkoxy, and most preferably $C_{1-4}$ alkyl, $C_{6-12}$ aryl or $C_{1-4}$ alkoxy. Preferably, $R^{13}$ is independently in each occurrence $C_{1-20}$ alkyl or hydrogen and most preferably $C_{1-4}$ alkyl or hydrogen. $R^{14}$ is preferably hydrogen or alkyl. Preferably $R^{14}$ is hydrogen or lower alkyl, more preferably hydrogen or $C_{1-6}$ alkyl, even more preferably hydrogen, methyl or ethyl and most preferably hydrogen or methyl. p is separately in each occurrence a number of from about 1 to about 3 and q is separately in each occurrence an integer from about 1 to about 2 wherein the sum of p and q on each silicon moiety is 3. Preferably,p is 2 or 3 and q is 0 or 1. n is separately in each occurrence an integer of about 1 or greater, more preferably about 4 or greater, even more preferably about 10 or greater, and most preferably about 20 or greater. n is separately in each occurrence an integer of about400 or less, preferably about 100 or less, more preferably about 60 or less, and most preferably about 50 or less. o is an integer of about 1 or greater, more preferably about 3 or greater, and most preferably about 4 or greater. o is an integer of about 9 or less, more preferably about 7 or less, and most preferably about 5 or less. r is an integer of 2 or 24.

Complexes using amine containing siloxane moieties with hydrolyzable groups correspond to Formula 13

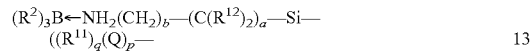

In another embodiment the amine is a amine terminated polysiloxane, and in one preferred embodiment is terminated with a polyoxyalkylene chain or has one pendant to a poly(siloxane) backbone. Such amines correspond to the general formula 14

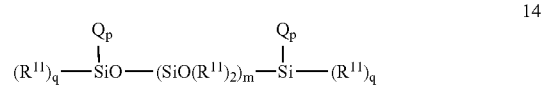

Wherein $R^{11}$, Q, p and q are as defined earlier, provided at least one of $R^{11}$ contains a primary or secondary amine, preferably a primary amines. m is separately in each occurrence a whole number of about 0 or greater, more preferably about 1 or greater and even more preferably selected such that the molecular weight of the compound is between about 250 and about 100,000 daltons, and more preferably between about 10,000 and 60,000 daltons.

The complex is given in Formula 15.

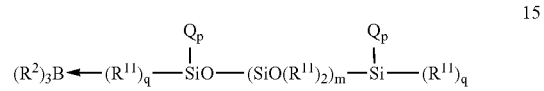

In another embodiment the amine is a poly(dialkyl or diaryl siloxane) backbone having amine end groups wherein at least one amine is primary. The amine may be a polyamine, meaning more than one amine nitrogen is Found in the group, or monoamine. Preferably these compounds correspond to the general formula 16

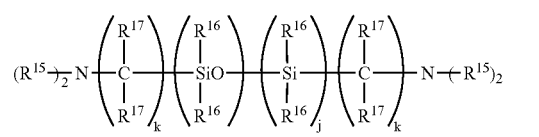

j and k are separately in each occurrence whole number chosen such that the molecular weight of the compound is between 250 and 10,000. $R^{15}$ is independently in each occurrence hydrogen, $C_{1-20}$ alkyl or $C_{1-20}$ aminoalkyl; more preferably hydrogen or $C_{1-20}$ aminoalkyl; and most preferably hydrogen. $R^6$ is separately in each occurrence hydrogen, alkyl, alkenyl, aryl, alkaryl, or aralkyl having up to about 20, preferably up to about 8, carbon atoms. $R^{17}$ is independently in each occurrence hydrogen, fluorine, $C_{1-20}$ hydrocarbyl, or $C_{1-20}$ fluorocarbyl; more preferably hydrogen, fluorine, $C_{1-8}$ alkyl or $C_{1-8}$ fluoroalkyl; and most preferably H or methyl. Preferably j is independently in each occurrence a number from about 1 or greater, more preferably a number of about 20 or greater; most preferably about 50 or greater. Preferably k is independently in each occurrence a number from of about 1 or greater and most preferably about 2 or greater. Preferably k is independently in each occurrence a number of about 8 or less, and most preferably about 3 or less. In one preferred embodiment the $R^{15}$ corresponds to the following formula in at least one occurrence

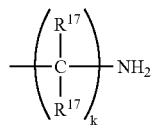

The complex is given in Formula 17

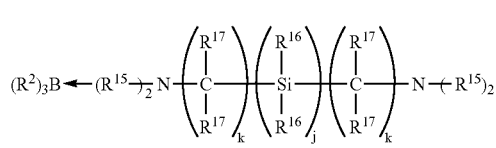

wherein $R^2$, $R^{15}$, $R^{16}$, $R^{17}$, j and k are as defined previously.

The equivalent ratio of amine compound(s) to borane compound in the complex is relatively important. An excess of amine is preferred to enhance the stability of the complex.

In the embodiment where the decomplexing agent is a di or poly isocyanate functional compound and the complex has 1 or 2 amine functionality of 2 or greater, the amines after decomplexation reacts with the isocyanate functional compound resulting in the presence of polyurea in the final product. The presence of polyurea improves the high temperature properties of the composition.

The polymerizable compositions of this invention includes a portion comprising polymerizable compounds capable of free radical polymerization and a second portion comprising unpolymerized or partially polymerized compounds containing siloxane functionality. The two portions can be miscible, partially miscible or immiscible. In a preferred embodiment the polymerized composition comprises two phases, one based on the compounds which polymerize through olefinic bonds and a second phase based on compounds which polymerize by condensation or addition. The cured compositions of the invention preferably contain two regions that in many cases are not miscible. In some embodiments, the two regions are separate phases or are interpenetrating networks of two different polymers. The two regions can be chemically bonded, through a covalent bond, to one another if the composition includes a crosslinking compound.

Compounds capable of free radical polymerization which may be used in the polymerizable compositions of the invention include any monomers, oligomers, polymers or mixtures thereof which contain olefinic unsaturation which can polymerize by free radical polymerization. Such compounds are well known to those skilled in the art. Mottus, U.S. Pat. No. 3,275,611, provides a description of such compounds at column 2, line 46 to column 4, line 16, incorporated herein by reference. Among preferred classes of compounds containing olefinic unsaturation are monomers, oligomers, polymers and mixtures thereof derived from the acrylates and methacrylates; olefinically unsaturated hydrocarbons, for example ethylene, propylene, butylene, isobutylene, 1-octene, 1-dodecene, 1-heptadecene, 1-eicosene and the like; vinyl compounds such as styrene, vinyl pyridine, 5-methyl-2-vinylpyridine, vinyl napthylene, alpha methylstyrene; vinyl and vinylildiene halides; acrylonitrile and methacrylonitrile; vinyl acetate and vinyl propionate; vinyl oxyethanol; vinyl trimethylacetate; vinyl hexonate; vinyl laurate; vinyl chloroacetate; vinyl stearate; methyl vinyl ketone; vinyl isobutyl ether; vinyl ethyl ether; compounds that have a plurality of ethylenic bonds such as those having conjugated double bonds such as butadiene, 2-chlorobutadiene, isoprene; and the like. Examples of preferable acrylates and methacrylates are disclosed in Skoultchi, U.S. Pat. No. 5,286,821 at column 3, lines 50 to column 6, line 12, incorporated herein by reference and Pocius, U.S. Pat. No. 5,681,910 at column 9, line 28 to column 12, line 25, incorporated herein by reference. More preferred olefinic compounds include methyl acrylate, methylmethacrylate, butylmethacrylate, tert-butylmethacrylate, 2-ethylhexyacrylate, 2-ethylhexylmethacrylate, ethylacrylate, isobornylmethacrylate, isobornylacrylate, hydroxyethylmethacrylate, glycidylmethacrylate, tetrahydrofurfuryl methacrylate, acrylamide, n-methyl acrylamide, and other similar acrylate containing monomers. Also useful are the class of acrylate tipped polyurethane prepolymers available commercially from several sources, and prepared by reacting an isocyanate reactive acrylate monomer, oligomer or polymer, Such as a hydroxy acrylate, with an isocyanate functional prepolymer. Also useful in these compositions are acrylate crosslinkinking molecules including ethylene glycol dimethacrylate, ethylene glycol diacrylate, triethyleneglycol dimethacrylate, diethylene glycol bismethacryloxy carbonate, polyethylene glycol diacrylate, tetraethylene glycol dimethacrylate, diglycerol diacrylate, diethylene glycol dimethacrylate, pentaerythritol triacrylate, trimethylolpropane trimethacrylate, isobornylmethacrylate and tetralhydrofurfuryl methacrylate Also very useful in compositions of the present invention is the class of acrylate and methacrylate tipped siloxane materials that can crosslink the acrylate and siloxane phases produced in this invention. Examples of such materials are (acryloxypropyl)trimethoxysiloxane and (methacryloxypropyl)trimethoxysiloxane, available from Shinitsu Silicones, acryloxy and methacryloxypropyl terminated polydimethylsiloxane, and (acryloxypropyl) and (methacrylcoxypropyl) methylsiloxane-dimethylsiloxane copolymer available from Gel-est (Tullytown, Pa.).

In the embodiment where the composition is used as an adhesive, acrylate and/or methacrylate based compounds are preferably used. The most preferred acrylate and methacrylate compounds include methylmethacrylate, butylmethacrylate, 2-ethylhexylmethacrylate, and cyclohexylmethylmethacrylate. Preferred amounts of acrylic monomer (acrylate and/or methacrylate based compounds) are preferably about 10 percent by weight or greater based on the total formulation weight, more preferably about 20 percent by weight or greater and most preferably about 30 percent by weight or greater. Preferred amounts of acrylic monomer (acrylate and/or methacrylate based compounds) are preferably about 90 percent by weight or less based on the total formulation weight, more preferably about 85 percent by weight or less and most preferred 80 percent by weight or less.

The compounds, oligomers or prepolymers having a siloxane backbone and reactive moieties capable of polymerization useful in this invention include any compound, oligomer or prepolymer containing siloxane units in the backbone and which have reactive groups which can polymerize under reasonable reaction conditions. Oligomer as used herein means a few identifiable chemical units linked together through reactive moieties. Oligomer can be thought of as a small polymer having only a few units, for instance a dimer, trimer, tetramer or pentamer. Mer is used to refer to one of the basic identifiable chemical units of a oligomer or polymer and often is the residue of the compound or compounds firm which the oligomer or polymer is derived. Prepolymer means compounds having several basic identifiable chemical units which comprise the polymer, that is, several mers, which also have reactive groups which allow the compounds to further react. In practice, a prepolymer is a mixture of polymers having varying numbers of basic identifiable chemical units of the polymer and may contain some amount of oligomers. The term having a siloxane backbone means herein that the backbone of the compounds, oligomers and/or polymers contains basic identifiable chemical units having silicone and oxygen atoms in the backbone. Preferably the basic identifiable chemical units of siloxane correspond to the formula

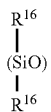

wherein $R^{16}$ is defined hereinbefore. The term reactive moieties capable of polymerization mean any moieties which react with one another or with other reactive moieties to form oligomers, prepolymers or polymers. Examples of preferred reactive moieties capable of polymerization include vinyl moieties, hydrolyzable moieties, hydroxyl moieties, hydrides, isocyanate moieties, amines or in the case of cyclic siloxanes is the reactive end formed by ring opening; and the like. More preferred reactive moieties capable of polymerization include vinyl moieties, hydrolyzable moieties, hydroxyl moieties, hydrides and the like.

The term hydrolyzable moiety is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group an acyloxy group, a ketoximate group, an amino group, an amido group, an amino-oxy group, a mercapto group, and an alkenyloxy group. An alkoxy group is more preferred with a methoxy or ethoxy group being most preferred, for ease in handling due to its mild hydrolyzablility. One to three hydroxyl groups or hydrolyzable groups may be bonded to one silicon atom. Where two or more hydroxyl groups or hydrolyzable groups are present per reactive silicon group, they may be the same or different.

The chemistry of siloxane polymerizations is well known and in general is applied to the current invention without substantial modification except that the reactants and catalysts may need to be separated into two part formulations to provide shelf life stability. The chemistry of siloxane polymerization is covered generally in many text books on the subject Such as, by K. J. Saunders $2^{nd}$ Ed, Chapman and Hall Publishers, London, (1988), Chapter 17, and, S. J. Clarson, J. J. Fitzgerald, M. J. Owen, and S. D. Smit, Editors, ACS Publishers, Washington, D.C. (2000), incorporated herein by reference.

The siloxane containing phase may be added to the formulation in the form of monomers, oligomers, cyclic oligomers, or polymers which upon mixing will further react to build molecular weight.

One class of siloxane polymers which are useful in the practice of this invention include vinyl functionalized siloxanes which may be further polymerized via fire radical or addition mechanisms. Vinyl functionalized siloxanes comprise compounds, oligomers, and prepolymers which have siloxane units in the backbone and have polymerizable olefinic moieties. The vinyl functionalized siloxanes may contain hydrocarbylene and/or fluorocarbylene units in the backbone. Hydrocarbylene means a divalent moiety comprising carbon and hydrogen. Fluorocarbylene is a hydrocarbylene moiety with at least one of the hydrogens replaced with fluorine atoms, in some embodiments all of the hydrogens may be replaced with fluorine atoms. Preferred hydrocarbylene moieties are alkylene. Preferred fluorocarbylenes are partially or wholly fluorine substituted alkylenes. Preferred olefinic moieties include acrylate, methacrylate, vinyl, acetylenyl and the like. Preferably the vinyl functionalized siloxanes preferably contain moieties corresponding to the formula wherein V is a group containing olefinic unsaturation, $R^{16}$ is as previously defined. h is separately in each occurrence an integer of 5 or greater, more preferably an integer of 10 or

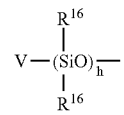

greater and most preferably an integer of 15 or greater. h is separately in each occurrence an integer of 50 or less, more preferably an integer of 40 or less and most preferably an integer of 30 or less. The vinyl functionalized siloxanes may also contain moieties in the backbone which correspond to the formula

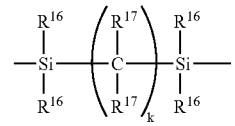

wherein $R^{16}$, $R^{17}$, h and k are as defined previously.

Vinyl functionalized siloxanes may also react with a siloxane based compound, oligomer or polymer having a hydrogen (hydride functionalized siloxanes) or hydroxyl moiety bound to silicon. The hydride or hydroxyl functional silicon compound can be reacted with the vinyl functional siloxane at the point of unsaturation by a hydrosilylation reaction. This reaction is described in Kawakubo, U.S. Pat. No. 4,788,254, column 12, lines 38 to 61, U.S. Pat. Nos. 3,971,751; 5,223,597; 4,923,927; 5,409,995 and 5,567,833, relevant parts incorporated herein by reference. Vinyl functionalized polydialkylsiloxanes may also be co-polymerized with diphenylsiloxane to further enhance low temperature properties. These materials can be used by processing either through addition cure using Pt catalysts or radical coupling using peroxide catalysts at room temperature. Fluorine substitution enhances the solvent resistance of the formed compositions.

Hydride functionalized siloxanes also are useful within the scope of this invention. Hydride functional siloxanes undergo two main classes of reaction. The first is hydrosilation involving reaction with a vinyl functionalized polymer catalyzed with a Pt catalyst. The second reaction, dehydrogenation, involves, for example, the coupling reaction between a hydride functional siloxane and a hydroxy functionalized siloxane by coupling the chains and eliminating hydrogen gas. These reactions are commonly catalyzed with a variety of metal salt catalysts known to those skilled in the art, for instance organo tin compounds such as dibutyltin diacetate, bis(2-ethyl-hexanoate)tin, zinc octoate, or iron octoate. Both hydrosilation and dehydrogenation couple siloxane chains and, when the functionality of the hydride, vinyl and hydroxy containing moieties are two or greater, can produce extended or crosslinked networks with rubber-like properties at room temperature. Preferably the hydride functional siloxanes contain terminal moieties corresponding to the formula

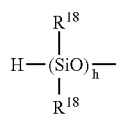

and backbone moieties corresponding to the formula

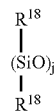

wherein $R^{18}$ is separately in each occurrence hydrogen or alkyl, alkenyl, aryl, alkaryl, or aralkyl having up to about 20, preferably Lip to about 8, carbon atoms; h and j are defined hereinbefore.

Further the hydrides may contain moieties in the backbone corresponding to the formula

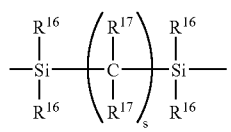

wherein $R^{16}$ and $R^{17}$ are as defined hereinbefore and s is separately in each occurrence about 1 or greater and preferably 3 or greater, preferably 10 or less and most preferably 8 or less.

Another class of siloxane containing compounds, oligomers or prepolymers useful in this invention are siloxanes having terminal silanol groups or hydrolyzable groups which upon exposure to moisture form silanol groups. Terminal silanol groups on siloxane chains allow the compounds, oligomers or prepolymers react via condensation when catalyzed. These reactions proceed at room temperature as either a one part or two-part polymerization system. This reaction occurs at room temperature in the presence of silanol condensation catalysts. Silanol condensation catalysts are well known in the art and include the following: titanic acid esters, such as tetrabutyl titanate, tetrapropyl titanate, etc.; organotin compounds; organoaluminum compounds, such as aluminum trisacetylacetonate, aluminum trisethylacetonate, diisopropoxyaluminum ethylacetonate, etc.; reaction products, such as bismuth salts and organic carboxylic acids, such as bismuth tris(2-ethylhexoate), bismuth tris(neodecanoate), etc.; chelate compounds, such as zirconium tetracetylacetonate, titanium tetraacetylacetonate, etc.; organo lead compounds, such as lead octylate; organovanadium compounds; amine compounds, such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,1-diazabicyclo(5,4,0)undecene-7 (DBU), etc., or their salts with carboxylic acid, etc.; low-molecular-weight polyamide resins obtained from excess polyamines and poly basic acids; reaction products of excess polyamines and epoxy Compounds; etc.

Preferred organotin catalysts useful for the silanol condensation reaction are well known in the art. Among preferred tin compounds useful for silanol condensation are, dialkyltin(IV) salts of organic carboxylic acids, such as dibutyltin diacetate, dimethyl tin dilaurate, dibutyltin dilaurate, dibutyltin maleate or dioctyltin diacetate; tin carboxylates, such as tin octylate or tin naphthenate; reaction products of dialkyltin oxides and phthalic acid esters or alkane diones; dialkyltin diacetyl acetonates, such as dibutyltin diacetylacetonate (also commonly referred to as dibutyltin acetylacetonate); dialkyltin oxides, such as dibutyltinoxide; tin(II)salts of organic carboxylic acids, such as tin(II) diacetate, tin(II) dioctanoate, tin(II) diethylhexanoate or tin(II) dilaurate; dialkyl tin (IV) dihalides, such as dimethyl tin dichloride; and stannous salts of carboxylic acids, Such as stannous octoate, stannous oleate, stannous acetate, or stannous laurate. However, these compounds are not particularly limited; one can use any silanol condensation catalysts that are in general use. Among these silanol condensation catalysts, organometallic compounds or combinations of organometallic compounds and amine compounds are preferable from the point of view of curability. These silanol condensation catalysts may be used individually or in combinations of 2 or more. Preferred catalysts are the dialkyl tin dicarboxylates, dialkyl tin oxides, dialkyl bis(acetylacetonates), reaction products of dialkyltin oxide and phthalic acid esters or an alkane dione, dialkyltin halides and dialkyl tin oxides. Even more preferred catalysts are dibutyltin dilaurate, dimethyltin dilaurate, dibutyltin maleate, dibutyltin diacetate, tin octylate, tin naphthenate, reaction products of dibutyltin oxide and phthalic acid esters or pentanedione, dibutyltin diacetylacetonate, dibutyltinoxide, and dimethyl tin chloride. The amount of catalyst used in the formulation is that amount which facilitates the cure of the adhesive without causing degradation of the adhesive after cure. The amount of catalyst in the adhesive formulation is preferably about 0.01 percent by weight or greater, more preferably about 0.1 percent by weight or greater, and most preferably about 0.2 percent by weight or greater, and preferably about 5 percent by weight or less, even more preferably about 1.0 percent by weight or less and most preferably about 0.4 percent by weight or less.

Cyclosiloxanes or cyclic siloxanes can also be useful in the practice of the present invention. Cyclosiloxanes are compounds containing one or more ring structures containing siloxane units. These materials can undergo ring opening polymerization in the presence of bases catalysis and catalytic quantities of water. Cyclic siloxanes are useful, are well known, commercially available materials and are disclosed in Harkness, et al. U.S. Pat. No. 6,001,928, Currie et al. U.S. Pat. No. 6,054,548 and Halloran et al. U.S. Pat. No. 6,207,781, all incorporated herein by reference.

Siloxane units useful in cyclosiloxanes preferably correspond to the formula

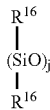

Performance of ring opening cyclic siloxane polymerization in the practice of the present invention can bring benefits to polymerizable compositions of the present invention, in a manner similar to the other technologies discussed when formulated in such a way that the components of the composition are not detrimental to the functions of the end product. Catalysts useful in the polymerization of cyclic cyclosiloxanes are well known in the art. Preferably, alkaline catalysts such as phosphazenes and alkaline silanolates are used. Other useful catalysts are disclosed in U.S. Pat. No. 6,001,928 at column 1, lines 17 to 23 and U.S. Pat. No. 6,207,781 incorporated herein by reference. The catalysts are used amounts which is well known to those of skill in the art.

Silanol or functionalized siloxanes are also useful in formulation of moisture curing systems. This chemistry is currently practiced throughout the sealing and coating industry by such companies as Dow Corning and General Electric. This room temperature chemistry can be practiced by many routes, all of which can find use within the scope of the current invention. Chemistry utilizing moisture curable siloxanes is described by U.S. Pat. Nos. 5,948,854 and 6,008,284 and references therein describing the use of titanium catalysts to promote moisture cure between silanol functionalized siloxanes and alkoxy functionalized siloxanes.

The siloxane functional polymers may in some cases be kept stable in a formulation which begins to polymerize and crosslink when in contact with atmospheric moisture. Many commercial materials take advantage of this ability of siloxane chemistry to allow for the creation of a single component product. The present invention is compatible in many cases with siloxane moisture cure technology.

Some moisture curing technologies for siloxanes operate with the reaction of atmospheric moisture and a compound to produce an acid. This ability of some materials to be latent acid producers makes them attractive in the present invention to create a one component adhesive. In this case the polymerizable composition would consist of a stable trialkylborane-amine complex with a monomer composition capable of flee radical polymerization and the latent acid producer. Siloxane functional materials are within the class of materials capable of producing acid upon exposure to atmospheric moisture. Examples of siloxane functional latent acid producer is ethytriacetoxysiloxane and methyl triacetoxysiloxane.

Polyacrylate materials can vary their glass transition temperature (Tg) by varying the monomer composition in the formulation. However, if the Tg of these materials is below room temperature, the properties of the adhesive can significantly deteriorate as the polymer tends to creep or flow. The low Tg acrylates can be crosslinked, however, this can also damage the compositions of the present invention by causing too rapid polymerization of the monomer. The presence of functional siloxane polymerizable compounds, such as described above, improves low temperature flexibility and elongation of polymerized or partially polymerized composition by providing a phase of very low Tg polymer while still providing excellent adhesion to low surface energy substrates. A sufficient amount of the siloxane functional materials are used to improve the physical properties of the polymerized or partially polymerized composition and to improve the low temperature properties of the polymerized or partially polymerized composition. The Tg of the compositions can be controlled by controlling the amount of siloxane polymer, and its crosslink density. An amount of siloxane polymer is present to achieve a glass transition temperature of about 0° C. or less. Preferably the polymeric compositions demonstrate lap shear strength is about 100 psi or greater. It is preferred that the total polymerizable formulation contain about 1 percent by weight or greater of siloxane polymerizable compound; more preferably about 2 percent by weight or greater and most preferred about 3 percent by weight or greater. It is preferred that the polymerizable formulation contain about 90 percent by weight or less, more preferably about 85 percent by weight or less and most preferably about 80 percent by weight or less of siloxane polymerizable compound.

A convenient method of incorporating additional functionality into the polymerizable composition and improve the physical properties of the siloxane functionality is to include in the formulation polyfunctional siloxane containing crosslinkers. Polyfunctional siloxane containing crosslinkers comprise compounds, oligomers and polymers which contain siloxane units and at least two, preferably 2 to 4, functional groups which react with the functional groups of the reactive materials present to crosslink the polymeric materials present. Preferably there are at least two different functional groups present which react with different compounds, oligomers or polymers present to link the different polymeric materials formed together. Preferably one reacts with the siloxane based materials and one reacts with the functional materials containing unsaturated groups, which are not olefinic in nature, present or formed in the reaction. Examples of such materials are (3-glycidylpropyl) trimethoxy siloxane, (acryloxypropyl)trimethoxysiloxane, and (methacryloxypropyl)trimethoxy siloxane, (methacrylopropy)methylsiloxane-dimethlylsiloxane copolymer, methacryloxypropylpropylterminated polydimethylsiloxane, (acryloxypropyl)methylsiloxane-dimethylsiloxane copolymer and the like. In one embodiment an oxirane ring is incorporated into the formulation as well as a alkoxy siloxane capable of crosslinking silanol functional siloxane containing polymers. In the other cases acrylic and methacrylic functionality is incorporated capable of crosslinking the siloxane containing phase to an acrylic phase. Other examples are mercapto functional siloxanes and isocyanato functional siloxanes. All of these materials are commercially available from companies such as Shin-Etsu Silicones, Witco, Dow Corning, Gelest and others. Siloxane containing compounds, oligomers and/or prepolymers which vinyl and hydrolyzable groups may also be used.

In some cases it may be useful to crosslink the free radical polymerizable compound phase to the siloxane compound derived phase. This is achieved using a bi-functional monomer, hereinafter referred to as a crosslinker-, containing both olefinic unsaturation functionality, for instance, an acrylic moiety, and silicone functional polymerizable functionality. Examples of this type of material include (acryloxypropyl) trimethoxysiloxane and (methycryloxypropyl)trimethoxysiloxane. Similarly the siloxane phase can be crosslinked to the rigid polyurea phase produced by the reaction of the amine from the alkylborane-amine complex and an isocyanate. Such crosslinking materials include 3-aminopropyltriethoxysiloxane, 3-aminiopropyltriethoxysiloxane, 3-isocyantopropyltrimentooxysiloxane, N-(2-aminoethyl)-3-aminiopropyltrimethoxysi loxane. Such compounds react under normal conditions of the reaction with reactive components of a separate phase of the polymerizable composition. The amount of crosslinker used is that amount which gives the desired properties, that is, a sufficient lap shear strength at room temperature, yet does not cause the bond flexibility strength to go below the desired value. Preferred amounts of crosslinker are about 0 percent by weight or greater based on the weight of the polymerizable formulation, more preferably about 1 percent by weight or greater; most preferably about 2 percent by weight or greater. Preferably the amount of crosslinker used is about 20 percent by weight of the total polymerizable formulation or less; even more preferably about 15 percent by weight or less and most preferably about 12 percent by weight or less.

It is preferable that the siloxane polymerizable compounds polymerize at a similar rate as the polymerization rate of the compounds containing moieties capable of free radical polymerization. If the reaction of one polymerizable component is too slow, the composition may vitrify or gel prior to obtaining acceptable conversion of monomer or oligomer to polymer of both phases. The unreacted components can act as a plasticizer and degrade properties, such as adhesion, thermal performance and the like. The properties of the final polymerized composition may be enhanced by post heating the polymerized composition to drive the completion of the polymerization. This is performed by heating the polymerized composition to a temperature above its glass transition temperature. In this embodiment it is preferred to post cure at the expected use temperature of the structure, more preferred at 5° C. above the expected use temperature of the composition and most preferred to provide a thermal post cure of 10° C. above the expected use temperature of the polymerized composition In a preferred embodiment the reaction of siloxane functional materials containing epoxy substituent(s) is achieved by incorporation of a catalyst as described by Saunders, K. J. in *Organic Polymer Chemistry*, $2^{nd}$ Edition, Chapter-17 (1988), incorporated herein by reference. A variety of catalysts are useable in the practice of the current technology depending on the silicone chemistry being employed. Tin catalysts are often used to promote reactions between siloxane functional materials. Favored tin catalysts include dibutyltin diacetate and dibutyl tin dilaurate. Tetraalkoxytitanium catalysts have been described by de Buyl et al, in U.S. Pat. No. 5,948,854 and in improvement by Nylund et al. in U.S. Pat. No. 6,008,284 for moisture curable room temperature vulcanizates. Various acidic catalysts are taught by Falender et al. in U.S. Pat. No. 4,448,927 all of which are included herein by reference. Platinum catalysts are also employed for polymerization of vinyl functionalized siloxanes. Examples of favored platinum catalysts include chloroplatinic acid and platinum (0)-1,3-divinyl-1,1,3,3-tetramethyldisiloxane complex. The previous examples of useful catalysts are just provided for illustration and the present invention is not limited to them. In general, any catalyst that is useful for polymerizing siloxane functional monomers or oligomers will be useful in the present invention as long as it does not interfere with the catalyst or polymerizable components of the free radical component of the present invention.

Catalysts are used in sufficient amounts to initiate polymerization of the siloxane functional compounds, in particular they can be used in relatively small amounts. Preferably the amount of catalyst used is about 0.1 percent by weight of the total formulation or greater, more preferably about 0.25 percent by weight or greater and most preferably about 0.5 percent by weight or greater. Preferably the amounts of catalyst used is about 10 percent by weight of the total formulation or less, more preferably about 8 percent by weight or less and most preferably about 6 percent by weight or less.

The organoborane amine complexes useful for polymerization of the compounds having moieties capable of free radical polymerization require the application of a decomplexation agent that will displace the amine from the borane and initiate flee radical polymerization. The displacement of the amine from the alkylborane can occur with any chemical for which the exchange energy is favorable, such as mineral acids, organic acids, Lewis acids, isocyanates, acid chlorides, sulphonyl chlorides, aldehydes, and the like. Preferred decomplexation agents are acids and isocyanates. In those embodiments where an initiator for a ring opening polymerization is needed and is a Lewis acid, the decomplexing agent for the organoborane amine may be omitted as the Lewis acid may also function as the decomplexing agent. If the Lewis acid is used as the decomplexing agent and heterocyclic r ing opening polymerization initiator no additional amounts are needed over those amounts needed to initiate polymerization. The choice of initiator may be impacted by the desired end use of the polymerizable composition. In particular, where the polymerizable composition is an adhesive and the material to which it will be bonded is polypropylene, the preferred class of initiators is isocyanate initiators and where the substrate is nylon the preferred initiators are acids.

In one embodiment the decomplexing agent can be a siloxane compound which when exposed to moisture releases an acid which causes the organoborane amine complex to disassociate. Any siloxane compound which decomposes to release an acid may be used in this embodiment. Classes of compounds which contain siloxane and a moiety which decomposes to release an acid include halo silanes, acid anhydrides (carboxylic acids), acetoxy siloxanes, alkyl silicic acids, esters of carboxylic acids and silanols, acid chlorides and the like. Preferred compounds include silanol esters of carboxylic acids, acid anhydrides, acid chlorides and acetoxy silanes. Examples of siloxane functional latent acid producer is ethytriacetoxysiloxane and methyl triacetoxysiloxane.

Free radical polymerization of olefinic, unsaturated components may also be initiated thermally. The temperature at which the composition is heated to initiate polymerization is dictated by the binding energy of the organoborane amine complex. Generally the temperature used to initiate the polymerization by decomplexing the complex is about 30° C. or greater and preferably about 50° C. or greater. Preferably the temperature at which thermally initiated polymerization is initiated is about 120° C. or less and more preferably about 100° C. or less. Any heat source that heats the composition to the desired temperature can be used, provided the heat source does not negatively impact the components of the composition or its function. In this manner the composition may be contacted with the substrates either before or after the composition is exposed to heat. If the composition is heated prior to contact with the substrates, the composition should be contacted with the substrates before the composition has polymerized to the point at which the composition is no longer able to adhere to the substrates. It may be necessary in the thermally initiated reaction to control the oxygen content such that there is adequate oxygen to create favorable conditions for radical formation but not so much as to inhibit the polymerization. Catalyst levels for the reaction of other polymerizable species may need to be adjusted to ensure approximately equal reaction time for all polymerizations.

In one embodiment of the invention the siloxane polymers may be polymerized utilizing a moisture cure mechanism by which a component of the system is unreactive with the siloxane components, but becomes reactive upon exposure to moisture. The source of this moisture is usually the ambient environment, but may be provided from an encapsulated source. Various approaches have been employed to obtain good siloxane polymer properties, and these approaches can be used within the boundaries of the present invention. Commercially these formulations can be referred to as RTV-1 (room temperature vulcanization) for 1 part and RTV-2 for 2 part formulations. Several of the known approaches to RTV-1 are enumerated in *Silicones Chemistry and Technology*, edited by the technical staffs at Bayer AG, Th. Goldschmidt AG, Wacker-Chemie GmbH, and Haus der Technik e.V., CRC Press, Boca Raton (1991), pp 45–60 incorporated herein by reference and Nylund et al. U.S. Pat. No. 6,008,284, de Buyl, et al. U.S. Pat. No. 5,948,854, Korner, et al. U.S. Pat. No. 6,090,904, and Kozakiewicz, et al. U.S. Pat. No. 5,705,561, all incorporated herein by reference.

The two-part polymerizable compositions or adhesive compositions of the invention are uniquely suited for use with conventional, commercially available dispensing equipment for two-part compositions. Once the two-parts have been combined, the composition should be used quickly, as the useful pot life (open time) may be short depending upon the monomer mix, the amount of complex, the amount of Lewis acid catalyst and the temperature at which the bonding is to be performed. The adhesive compositions of the invention are applied to one or both substrates and then the substrates are joined together, preferably with pressure to force excess composition out of the bond line. In general, the bonds should be made shortly after the composition has been applied, preferably within about 10 minutes. The typical bond line thickness is about 0.005 inches (0.13 mm) to about 0.03 inches (0.76 mm). The bond line can be thicker if gap filling is needed as the composition of the invention can function as both an adhesive and a gap filler. The bonding process can easily be carried out at room temperature and to improve the degree of bonding it is desirable to keep the temperature below about 40° C., more preferably below about 30° C., and most preferably below about 25° C.

The compositions may further comprise a variety of optional additives. One particularly useful additive is a thickener such as medium to high (about 10,000 to about 1,000,000) molecular weight polymethyl methacrylate which may be incorporated in an amount of about 10 to about 60 weight percent, based on the total weight of the composition. Thickeners may be employed to increase the viscosity of the composition to facilitate application of the composition.

Another particularly useful additive is all elastomeric material. The materials may improve the fracture toughness of compositions made therewith which can be beneficial when, for example, bonding stiff, high yield strength materials Such as metal substrates that do not mechanically absorb energy as easily as other materials, such as flexible polymeric substrates. Such additives can be incorporated in an amount of about 5 percent to about 35 percent by weight, based on the total weight of the composition. Useful elastomeric modifiers include chlorinated or chlorosulphonated polyethylenes Such as HYPALON 30 (commercially available from E. I. Dupont de Nemours & Co., Wilmington, Del.) and block copolymers of styrene and conjugated dienes (commercially available from Dexco Polymers under the Trademark VECTOR, and Firestone under the Trademark STEREON). Also useful, and even more preferred, are certain graft copolymer resins Such as particles that comprise rubber or rubber-like cores or networks that are surrounded by relatively hard shells, these materials often being referred to as "core-shell" polymers. Most preferred are the acrylonitrile-butadiene-styrene graft copolymers available from Rohm and Haas. In addition to improving the fracture toughness of the composition, core-shell polymers can also impart enhanced spreading and flow properties to the uncured composition. These enhanced properties may be manifested by a reduced tendency for the composition to leave an undesirable "string" upon dispensing from a syringe-type applicator, or sag or slump after having been applied to a vertical surface. Use of more than about 20 percent of a core-shell polymer additive is desirable for achieving improved sag-slump resistance. Generally the amount of toughening polymer used is that amount which gives the desired toughness to the polymer or the adhesive prepared.

Any additives that reinforce the siloxane containing component and do not inhibit the polymerization of the siloxane or flee radical components can be beneficial to the practice of this invention. Reinforcing agents well known to those skilled in the art my be used in this invention. Preferred reinforcing agents include fumed silica or organically modified fumed silica. Many treated fumed silicas are available and may find application within the practice of the invention. Surface treated fumed silica is a common additive as described, for example, in Lutz et al. in U.S. Pat. No. 4,344,800 and Falender et al. in U.S. Pat. No. 4,448,927, Collins et al. in U.S. Pat. No. 4,985,477, and also by Wu et al., *J. Appl. Polym Sci,* 80, (2001) 2341-2346, all incorporated herein by reference. Other additives commonly known to those skilled in the art my be used such as those disclosed in Wang et al., *J. Appl. Polym. Sci.,* 69, (1998), 1557–1561, incorporated herein by reference. Such commercial treated fumed silicas are available from companies like Cabot Corporation. Useful amounts of reinforcing agents are greater than about 0 percent. More preferred amounts of fumed silicas are greater than about 2 percent and most preferred amounts are greater than about 3 percent. Useful amounts of fumed silica or treated fumed silica are less than about 40 percent by weight. More useful amounts of fumed silica in the compositions is less than about 30 percent and most useful amounts of fumed silica is less than about 25 percent by weight in the compositions.

Small amounts of inhibitors, such as diphenylamines or hindered phenols, may be used, for example, to prevent or reduce degradation of the olefinic monomers during storage. Inhibitors may be added in an amount that does not materially reduce the rate of polymerization or the ultimate properties of an adhesive or other composition made therewith, typically about 10 to about 10,000 ppm (parts per million) based on the weight of the polymerizable monomers. For moisture curable compositions it may be useful to include compounds for scavenging fugitive moisture in the composition before it reacts with the active component.

Polymerizable compositions according to the invention may be used in wide variety of ways, including as sealants, coatings, primers, to modify the surface of polymers, and injection molding resins. They may also be used as matrix resins in conjunction with glass and metal fiber mats such as in resin transfer molding operations. They may further be used as encapsulants and potting compounds such as in the manufacture of electrical components, printed circuit boards and the like. Quite desirably, they provide polymerizable adhesive compositions that can bond a diverse myriad of substrates, including polymers, wood, ceramics, concrete, glass and primed metals. Another desirable related application is their use in promoting adhesion of paints to low surface energy substrates such as polyethylene, polypropylene, polyethyleneterephthalate, polyamides, and polytetrafluoroethylene, and their co-polymers. In this embodiment the composition is coated onto the surface of the substrate to modify the surface to enhance the adhesion of the final coating to the surface of the substrate.

The compositions of the invention can be used in coating applications. In such applications the composition may further comprise a carrier such as a solvent. The coating may further contain additives well known to those skilled in the art for use coatings, such as pigments to color the coating, inhibitors and UV stabilizers. The compositions may also be applied as powder coatings and may contain the additives well known to those skilled in the art for use in powder coatings.

The compositions of the invention can also be used to modify the surface of a polymeric molded part, extruded film or contoured object. Compositions of the invention can also be used to change the functionality of a polymer particle by surface grafting of polymer chains on to the unmodified plastic substrate.

Polymerizable compositions of the invention are especially useful for adhesively bonding low surface energy plastic or polymeric substrates that historically have been very difficult to bond without using complicated surface preparation techniques, priming, etc. By low surface energy substrates is meant materials that have a surface energy of about 45 mJ/m$^2$ or less, more preferably about 40 mJ/m$^2$ or less and most preferably about 35 mJ/m$^2$ or less. Included among such materials are polyethylene, polypropylene, acrylonitrile-butadiene-styrene, polyamides, syndiotactic polystyrene, olefin containing block co-polymers, and fluorinated polymers such as polytetrafluoroethlyene (TEFLON™) which has a surface energy of less than about 20 mJ/m$^2$. (The expression "surface energy" is often used synonymously with "critical wetting tension" by others.) Other polymers of somewhat higher surface energy that may be usefully bonded with the compositions of the invention include polycarbonate, polymethylmethacrylate, and polyvinylchloride.

The polymerizable compositions of the invention can be easily used as two-part adhesives. The components of the polymerizable compositions are blended as would normally be done when working with such materials. The decomplexing agent for the organoborane amine complex is usually included with the olefinic, polymerizable component so as to separate it from the organoborane amine complex, thus providing one-part of the two-part composition. The organoborane amine complex of the polymerization initiator system provides the second part of the composition and is added to the first part shortly before it is desired to use the composition. Similarly, catalyst for the siloxane polymerization is kept separate from at least one component of the siloxane functional compounds involved with polymerization. The appropriate catalyst for siloxane polymerization may be added to the first part directly or it may be predissolved in an appropriate carrier such as a reactive olefinic monomer, i.e., methyl methacrylate or a MMA/PMMA viscous solution.

For a two-part adhesive such as those of the invention to be most easily used in commercial and industrial environments, the volume ratio at which the two-parts are combined should be a convenient whole number. This facilitates application of the adhesive with conventional, commercially available dispensers. Such dispensers are shown in U.S. Pat. Nos. 4,538,920 and 5,082,147 (incorporated herein by reference) and are available from Conprotec, Inc. (Salem N.J.) under the trade name MIXPAC. Typically, these dispensers use a pair of tubular receptacles arranged side-by-side with each tube being intended to receive one of the two-parts of the adhesive. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two-parts. The blended adhesive is extruded from the mixing chamber onto a substrate. Once the tubes have been emptied, they can be replaced with fresh tubes and the application process continued.

The ratio at which the two-parts of the adhesive are combined is controlled by the diameter of the tubes. (Each plunger is sized to be received within a tube of fixed diameter, and the plungers are advanced into the tubes at the same speed.) A single dispenser is often intended for use with a variety of different two-part adhesives and the plungers are sized to deliver the two-parts of the adhesive at a convenient mix ratio. Some common mix ratios are 1:1, 2:1, 4:1 and 10:1, but preferably less than about 10:1 and more preferably less than about 4:1.

Preferably the mixed two-part compositions of the invention have a suitable viscosity to allow application without dripping. Preferably, the viscosities of the two individual components should be of the same order or magnitude. Preferably the mixed compositions have the viscosity of about 100 (0.1 Pa.S) centipoise or greater, more preferably about 1,000 (1.0 Pa.S) centipoise or greater and most preferably about 5,000 (5.0 Pa.S) centipoise or greater. Preferably the adhesive compositions have a viscosity of about 150,000 (150 Pa.S) centipoise or less, more preferably about 100,000 (100 Pa.S) centipoise or less and most preferably about 50,000 (50 Pa.S) centipoise or less.

In one embodiment the invention is a method for bonding two substrates together comprising A) reacting a hydroxy terminated siloxane with a tetraalkoxy silicate dispersed in an acrylate resin in the presence of an silanol condensation catalyst as described hereinbefore, for instance an organo tin or titanate catalyst, under conditions such that a siloxane polymer dispersed in acrylate resin is prepared;

B) contacting the siloxane based polymer dispersed in acrylate resin with an organoborane amine complex;

C) contacting the composition of step B with an effective amount of a compound which causes the complex to disassociate;

D) contacting the two substrates with a composition according to step C located between the two substrates and allowing the adhesive to cure.

One embodiment of the present invention allows for the use of the adhesive as a one-part composition. In this case a single tube will be used and applied in a simple manner without any complicated mixing prior to application. In this case it will be most beneficial to protect the components of the one-part adhesive from the introduction of any moisture prior to its application.

Specific Embodiments

The following examples are included for illustrative purposes only and are not intended to limit the scope of the claims. Unless otherwise stated all parts and percentages are by weight.

Preparation Of The Organoborane/Amine Complex 50 cc of a 1M solution of organoborane, for example tributyl borane (TBB) in ether solution (Aldrich), is added to a weighed round bottom flask. The solution is purged with nitrogen. A weighed amount of the amine, for example 3-amiinopropyltriethoxysiloxane (14.35 g, 1:1.3 molar ratio of boron to amine), is added in small portions to the organoborane solution, maintaining the temperature below 40° C. with an external ice bath. The amine is added to make a molar ratio of organoborane to amine of between 1:1 to 1:3. The solution is stirred for about 30 minutes and then the solvent is removed on a rotary evaporator at less than 40° C. The weight of the flask and complex are periodically compared to the theoretical weight to assure that the solvent is completely removed. The complex is tested for pyrophoric reactivity by placing a drop on a paper towel and looking for charring of the towel. Some pyrophoric complexes can be made less or non-pyrophoric by adding additional amine (lowering the organoborane:amine molar ratio).

Preparation of Adhesive Compositions

Two component (part) adhesives are produced as described below. One component (hardener) includes the organoborane amine complex mixed with non-mutually reactive siloxane functional components, for example, catalytically reactive siloxanes without catalyst. In some cases the borane amine complex and the siloxane containing materials are diluted with methylmethacrylate (MMA) and polymethylmethacrylate (PMMA), or other fillers, so as to obtain an appropriate mixing volume or viscosity. The other component (resin) contains other components of the siloxane functional components for reaction with the first component, acrylic resin and an optional decomplexing agent (for the organoborane amine complex), for example, acrylic acid or an isocyanate, such as, isophorone diisocyanate. The acrylic resin is a mixture of methylmethacrylate (MMA) and optionally polymethylmethacrylate (PMMA). The MMA and PMMA are stirred or rotated overnight to mix the PMMA into the MMA. Siloxane reaction catalyst(s), tougheners and fillers, such glass beads, can be added to either side as long as they do not interfere with the shelf life of the adhesive components.

The adhesive may be mixed at the desired volume ratio in air, in a bag, or through a pressurized gun. The adhesive is applied to test strips 1 inch (25.4 mm) wide by 0.125 inch (3.2 mm) thick with a 0.5 inch (12.7 mm) overlap, using polypropylene for low temperature, or using Nylon, Syndiotactic Polystyrene (sPS)/Nylon, or e-coated steel for high temperature and tested for adhesive strength as described hereinafter. The adhesive components are mixed and applied to one or both substrates. Adhesive thickness may be controlled by the addition of a few weight percent of glass beads to achieve the desired bond line thickness, for instance between 0.005 to 0.030 inches in diameter (0.13 mm to 0.76 mm). The coupons are mated to provide 0.25 inch squared (80 $mm^2$) to 1.0 inch squared (645 $mm^2$) substrate overlap in a lap-shear testing configuration. The samples are held in place with metal binder clips to provide constant force and facilitate the elimination of air bubbles in the adhesive during cure. The bonded samples were usually curled for at least about 24 hours before being mounted in a tensile testing apparatus (Instron) fitted with a sample oven. The samples are evaluated at crosshead speeds of 0.05 (0.13 mm) and 0.5 (13.0 mm) inches per minute for room temperature and high temperature (>100° C.) testing conditions, respectively. Maximum load (pounds) to break are recorded and maximum stress (psi) is calculated by dividing this load by the overlap area (inches squared). For high temperature testing the test strip is equilibrated to the desired temperature in the Instron tester's oven for at least 5 minutes before the test is started.

The following abbreviations are used in the following Tables.

MMA is methyl methacrylate.
PMMA is poly(methylmethacrylate).
AA is acrylic acid.
PDMS is polydimethyl siloxane.
PDMS-OH is hydroxy terminated PDMS.
PDMS-H is hydride terminated, 26 wt. % polyhydridomethyl siloxane/PDMS copolymer.
PdV is divinyl polydimethyl siloxane, vinyl terminated.
TBB is tri n-butylborane.
MOPA is 3-methoxy propylamine.
FPDA is isophorone diamine.
DMAPA is N,N-dimethylamino 3-propylamine.
IPDI is isophorone diisocyanate.
DBTDA is dibutyltindiacetate.
MPTMS is methacryloxypropyl trimethoxy siloxane.
TMOS is tetramethylorthosilicate.
3-IPTES is 3-Isocyanatopropyl triethoxy siloxane.
3-APES is 3 aminoproyltriethoxysiloxane.
3-APMS is 3-aminopropyltrimethoxysiloxane.
2-ame-3-apes is N-(2-aminoethyl)-3-aminopropyltriethoxysiloxane.
2-ame-3-apmdes is N-(2-aminoethyl)-3-aminopropylmethyldiethoxysiloxane.
2-ame-3-aptms is N-(2-aminoethyl)-3-aminopropyl trimethoxy siloxane.
iPP is isotactic polypropylene 6524, a product of Basell inc., Wilmington, Del.
Nylon is, in all cases, a heat-stabilized, 35 percent glass-filled nylon 6.
SPS-Nylon is, in all cases, a 30 percent sPS (syndiotactic polystyrene)/35 percent glass-filed, heat-stabilized nylon 6 blend, a product of The Dow Chemical Company
PET is in all cases a mineral filled PET product of Ticona Corporation designated EKX-215 Iceman is 2-isocyanatoethyl methacrylate
VS5500 is a hollow glass sphere, a product of 3 M Corp., Minneapolis, Minn.
H-29 is a 1:1.3 molar ratio complex of TBB and MOPA.
H-28 is a 1:1.1 equivalent ratio complex of TBB to IPDA.
RMS is (methyl acryloxypropyl) methyl siloxane-dimethyl siloxane copolymer available from Gel-Est corporation.
"PDMS grafted PEG" is poly(dimethylsiloxane-co-methyl (3-hydroxypropyl)siloxane]-graft-poly(ethyleneglycol).
"Amino propyl terminated PDMS grafted PEG" is Poly (dimethylsiloxane-co-methyl(3-hydroxypropyl)siloxane]-graft-poly(ethyleneglycol)-3-aminopropylether.
APT-PDMS is bis(3-aminopropyl) terminated Poly(dimethylsiloxane).

">", when used with lap shear values, denotes substrate failure at the stress given and prior to an adhesive failure

EXAMPLES 1–6

Examples 1–6 describe the performance of catalysts of the present invention useful for making adhesives. These tri-alkylborane amine catalysts show good to excellent thermal stability, provide functionality for crosslinking silanol functional materials, and provide excellent adhesion to low surface energy plastic substrates. In all cases the catalyst is added at 4 percent weight of the total adhesive to a formulation consisting of acrylic resin and 4 percent acrylic acid. The "take-off" temperature presented in Table 1 is the temperature at which the organoborane amine catalyst thermally decomplexes and the resin (MMA and PMMA) begins to polymerize. The polymerization is seen as an increase in the viscosity of the mixture, which is continuously monitored with a viscometer during a linear heat ramp (~1 degree C. per minute). In all examples the complexes did not exhibit pyrophoricity. The siloxane functional amines furthermore provide functionality to the amines not otherwise available. The results are demonstrated in Table 1.

TABLE 1

| Example | Borane | Amine | Molar B:Amine | Take-off Temp (C.) | Lap Shear (on PP) psi (Kpa) RT |
|---|---|---|---|---|---|
| 1 | TBB | 3-APES | 1:1.1 | 38 | >444 (3061) |
| 2 | TBB | 3-APMS | | 52 | >900 (6205) |
| 3 | TBB | 2-ame-3-aptms | | 85 | >655 (4516) |
| 4 | TBB | 2-ame-3apmdes | | 75 | >604 (4164) |
| 5 | TBB | Amino propyl terminated PDMS grafted PEG | 1:1.3 | 42 | >279 (1924) |
| 6 | TBB | APT-PDMS | 1:1.3 | 42 | >920 (6343) |

EXAMPLES 7–16

Examples 7–16 demonstrate that adhesives of the present invention formulated with catalysts of the present invention can provide excellent adhesion to low surface energy substrates. In all cases the substrate is PET and the adhesive is formulated with 50 percent 44,000 molecular weight (MWT) PDMS-OH, 5 percent (methacryloxypropyl)trimethoxysiloxane, 1 percent DBTDA, 3% Cabosil 610 with the balance made up with methylmethacrylate monomer. The catalyst is tributylborane (TBB) complexed with a 1.1 or 1.5 mole of the indicated amine per mole of TBB. The adhesive contains 4 percent of the catalyst complex. The results are compiled in Table 2. The Lap shear testing was performed at room temperature (RT) of about 25° C. In all cases the failure was cohesive adhesive, which means the substrate surfaces both had adhesive coatings after failure.

TABLE 2

| Example | amine | initiator | Moles amine/ Mole TBB | Lap shear psi (kPa) |
|---|---|---|---|---|
| 7 | MOPA | IPDI | 1.1 | 390 (2688) |
| 8 | IPDA | IPDI | 1.1 | 498 (3434) |
| 9 | 3-APES | 3-IPTES | 1.1 | 334 (2303) |
| 10 | 3-APES | 3-IPTES | 1.5 | 303 (2089) |
| 11 | 3-APES | IPDI | 1.1 | 417 (2875) |
| 12 | 3-APES | IPDI | 1.5 | 420 (2896) |
| 13 | 2-ame-3-aptms | IPDI | 1.1 | 435 (2999) |
| 14 | 2-ame-3-aptms | IPDI | 1.5 | 530 (3654) |
| 15 | 2-ame-3apmdes | IPDI | 1.1 | 508 (3503) |
| 16 | 2-ame-3apmdes | IPDI | 1.5 | 561 (3867) |

The data in Table 2 show that the catalysts and initiators of the present invention are capable of promoting excellent adhesion to low surface energy substrates using adhesives of the present invention. The data also show that the catalysts are effective under a variety of initiating stoichiometries. Examples 9 and 10 show that these catalysts can be initiated with isocyanate functionalized siloxanes that similarly provide siloxane functionality for reaction with silanols and promote adhesion to very low surface energy plastic substrates.

EXAMPLES 17–21 AND COMPARATIVE A

Examples 17–21, relative to Comparative A, demonstrate the effect of small amounts of siloxane polymer to enhance the toughness of brittle acrylic formulations for adhesion to low surface energy iPP substrates. In all experiments the siloxane polymer is the reaction product of a 4:1 wt. ratio of 250 equivalent weight PDMS-OH with TMOS catalyzed with 0.1 percent of DBTDA based on total adhesive weight. The free radical polymerization was catalyzed by addition of H-29, initiated with ICEMAN. Comparative Example A was an identical system but without a PDMS/TMOS component. The brittle/ductile nature of samples was determined according to ASTM D746. The results are compiled in Table 3.

TABLE 3

| Example | % PDMS | Lap Shear psi (kPa) | Failure | Bond displacement in (mm) | Brittle/ ductile |
|---|---|---|---|---|---|
| Comparative A | (0) | >517 (3565) | substrate | 0.03 (7.6) | brittle |
| 17 | 1 | >728 (5012) | substrate | 0.25 (6.4) | ductile |
| 18 | 2 | >457 (3151) | substrate | 0.09 (2.3) | ductile |
| 19 | 5 | >824 (5681) | substrate | 0.31 (7.6) | ductile |
| 20 | 10 | >422 (2910) | substrate | 0.08 (2.0) | ductile |
| 21 | 15 | 70 (483) | adhesive | 0.02 (0.5) | ductile |

Examples 17–21 and Comparative Example A show that the incorporation of siloxane functional polymer into an acrylic resin can significantly enhance the room temperature toughness of the adhesive applied to very low Surface energy substrates. These examples also demonstrate that the adhesive can be formulated with the siloxane polymer pre-reacted within the adhesive prior to application. Bond displacement means the yield distance of the bond line prior to break. Brittle means that the adhesive fails and ruptures at a set tension and elongation. Ductility is elongation after yield in a uniaxial tension test. Ductile failure is indicated by a measurable irreversible deformation of the adhesive prior to failure and is indicated by failure of the bond line, cohesively, with multiple initiation sites. The determination of the Ductile Brittle failure is made by examination of the failed bondline. See *Properties of Polymers*, chapter 10, by D. W. van Kreulen, Elsevier Publishing, 1972.

EXAMPLES 22–27

Examples 22–27 demonstrate the effect of silicone functional crosslinker oil the measured adhesion of adhesives. All substrates were PET. All indicated fractional amounts are weight fractions based on total adhesive weight. All adhesives were formulated using 50 percent 44,000 MWT (number average) PDMS-OH, 1 percent DBTDA, 4 percent H-29, 4 percent IPDI, and 3 percent Cabosil 530. The balance was acrylic resin from which substitution was made with crosslinker. The crosslinker is in each case is (acryloxypropyl)trimethoxysiloxane which is capable of crosslinking the siloxane and acrylic phases together. Lap shear testing was performed on samples of each example according to the procedures described hereinbefore at a temperature of 25° C. The results are compiled in Table 4.

TABLE 4

| Example | % Crosslinker | Lap Shear psi (kPa) | Failure mode |
|---|---|---|---|
| 22 | 0 | 0 | adhesive |
| 23 | 2 | 255 (1758) | ca |
| 24 | 4 | 345 (2379) | ca |
| 25 | 7 | 335 (2310) | ca |
| 26 | 10 | 277 (1910) | ca |
| 27 | 15 | 220 (1517) | ca |

The data in Table 4 show that crosslinker is an advantageous component of these formulations, that the preferred concentration of crosslinker is between about 2 percent and about 10 percent of the total adhesive weight, and that formulations of this invention are capable of achieving excellent adhesion to this low surface energy substrate.

EXAMPLES 28–32

Examples 28–32 were formulated with 5 percent (acryloxypropyl)trimethoxysiloxane, 1 percent DBTDA, 4 percent 1H-29, 4 percent IPDI, 3 percent Cabosil 610, with the balance made up of acrylic resin from which substitution was made to include the indicated amount of 44,000 MWT PDMS-OH. In all cases the failure was cohesive adhesive. Lap shear tests were performed using PET and iPP substrates at a temperature of about 25° C. The results are compiled in Table 5.

TABLE 5

| Example | % PDMS | lap Shear PET psi (kPa) | Lap shear iPP psi (kPA) |
|---|---|---|---|
| 28 | 40 | 460 (3172) | 247 (1703) |
| 29 | 50 | 450 (3103) | 258 (1779) |
| 30 | 55 | 395 (2723) | 141 (972) |
| 31 | 60 | 186 (1282) | |
| 32 | 70 | 155 (1069) | |

Table 5 shows that very good adhesion can be obtained when the major phase of the adhesive is siloxane and that adhesion can be obtained on very low surface energy substrates.

EXAMPLES 33–42

An alternative method of crosslinking phases of polymer blends is to chemically bond the ends of one phase to the other phase. Such block copolymers are then chemically dispersed as a function of the phase separation kinetics and the molecular weights of the blocks. Materials such as (methacryloxypropyl)methyl-siloxane dimethylsiloxane copolymer is an example of a material capable of forming a phase separated structure whose dispersion is dependent on the molecular block lengths. In all cases the compositions comprised 44,000 molecular weight PDMS-OH, the indicated acrylate end functionalized siloxane with either 1000–2000 centistoke (0.001 to 0.002 $M^2/s$) viscosity (RMS-33) or 2000–3000 centistoke (0.002 to 0.003 $M^2/s$) viscosity (RMS-83), (methacryloxypropyl)trimethoxysiloxane (MPTMS) was used as the crosslinker, and Cabosil 610 surface treated fumed silica was used as a structural filler. In all cases the free radical polymerization was catalyzed by addition of a 1:1.05 molar ratio complex of TBB:MOPA (2 percent in adhesive) and initiated with 2 percent based on total adhesive weight addition of IPDI. In all cases the siloxane polymerization was catalyzed by 2 percent addition of DBTDA based on total adhesive weight. The balance of the formulation was methyl methacrylate. Lap shear testing on the substrate indicated was performed according to the procedure described hereinbefore at a temperature of about 25° C. The results are compiled in Table 6.

TABLE 6

| Example | substrate | % PDMS-OH | % MPTMS | % RMS | % RMS | % Cabosil | Lap shear psi (kPa) |
|---|---|---|---|---|---|---|---|
| 33 | PET | 50 | 5 | 83 | 10 | 3 | 192 (1324) |
| 34 | PET | 50 | 2.5 | 83 | 5 | 3 | 218 (1503) |
| 35 | PET | 40 | 5 | 83 | 10 | 3 | 386 (2661) |
| 36 | iPP | 40 | 5 | 83 | 10 | 3 | 185 (1276) |
| 37 | PET | 40 | 7.5 | 83 | 10 | 3 | 409 (2820) |
| 38 | iPP | 40 | 7.5 | 83 | 10 | 3 | 191 (1317) |
| 39 | PET | 30 | 5 | 83 | 10 | 6 | 381 (2627) |
| 40 | iPP | 30 | 5 | 83 | 10 | 6 | 336 (2317) |
| 41 | PET | 40 | 5 | 33 | 10 | 3 | 363 (2503) |
| 42 | iPP | 40 | 5 | 33 | 10 | 3 | 227 (1565) |

Table 6 shows that incorporation of acrylate functionalized PDMS into the polymerizable compositions of the present invention can result in excellent adhesives for very low surface energy plastic substrates. All failures were ca.

EXAMPLES 43 AND COMPARATIVE B–D

Example 43 compares a formulation of the current invention with 3 commercial silicone RTV-1 adhesives of the Dow Corning Corporation. The RTV-1 adhesive of the present invention is formulated from components in the following weights: 2 grams 44,000 molecular weight hydroxy terminated PDMS, 3 grams of acrylic resin, 0.28 grams ethyltriacetoxy siloxane, 0.1 grams DBTDA, and 0.5 grams Cabosil 530.

These were applied as one part adhesives to the substrates. The comparative materials were applied from freshly opened tubes. In all cases the substrate was PET. Lap shear testing on the substrate indicated was performed according to the procedure described hereinbefore at a temperature of about 25° C. The results are compiled in Table 7.

TABLE 7

| Example | adhesive | Lap shear psi (kPa) | Failure mode |
|---|---|---|---|
| 43 |  | 227 (1565) | ca |
| Comparative B | DC-738 | 10 (69) | a |
| Comparative C | DC-739 | 55 (379) | a |
| Comparative D | DC-832 | 131 (903) | ca |

The data in Table 7 shows that RTV-1 adhesives of the present invention can provide adhesion to low surface energy substrates that is not obtained by conventional silicone adhesives on the same substrates. DC-738, DC-739 and DC-832 are one part RTV siloxane adhesives available from Dow Corning Corporation, Midland, Mich.; "ca" means cohesive adhesive failure "a" means the adhesive has delaminated from the substrate with no apparent transfer of the adhesive to the substrate.

EXAMPLES 44–46

Examples 44–46 were performed to provide evidence that the free radical and siloxane polymerization chemistry can be equally and effectively performed simultaneously using moisture cure chemistry to provide excellent room temperature adhesion to low surface energy substrates. The RTV-1 experiments took advantage of the hydrolysis of ethyltriacetoxysiloxane to provide initiation of the free radical polymerization and tin or alkoxy titanium catalysts to initiate moisture cure of alkyloxysiloxanes and hydroxy siloxanes. The adhesives of the experiments were prepared with 5.4 grams of acrylic resin, 3 grams of 44,000 MWT PDMS-OH, 0.7 grams of ethyltriacetoxysiloxane, 0.3 grams of tin (II) catalyst or titanium (IV) and 0.4 grams of H-29. The adhesive composition was mixed in a glass vessel and applied as a one part adhesive. In all cases the substrate was PET. The lap shear tests were performed at about 25° C. The results are compiled in Table 8. All failures were cohesive adhesive.

TABLE 8

| Example | catalyst | Lap shear psi (kPa) |
|---|---|---|
| 44 | DBTDA | 270 (1862) |
| 45 | Titanium (IV) propoxide | 482 (3323) |
| 46 | Titanium (IV) isopropoxide | 638 (4399) |

The data in Table 8 shows that RTV-1 moisture cure adhesives of the present invention using alternative catalysts are capable of providing excellent adhesion to low surface energy substrates.

EXAMPLES 47–51

In Examples 47–51 the adhesive was formulated from a mixture of 8.8 grams acrylic resin, 0.8 grams ethyltriacetoxysiloxane and 0.4 grams H-29. A small and variable amount of ketiminopropyltriethoxysiloxane was added to improve shelf life. The adhesive composition was mixed in a glass vessel and applied as a one part adhesive. The lap shear tests were performed at about 25° C. The results are compiled in Table 9.

TABLE 9

| Example | % ketimine (wt) | Lap shear PET psi (kPa) | Lap Shear nylon psi (kPa) | Shelf life (days) |
|---|---|---|---|---|
| 47 | 0 | 656 (4523) | 265 (1827) | <2 days |
| 48 | 0.5 | 706 (4868) |  | >7 days |
| 49 | 1.0 | 796 (5488) | 232 (1600) | >7 days |
| 50 | 2.0 | 683 (4709) |  | >7 days |
| 51 | 4.0 | 547 (3771) |  | >7 days |

Examples 47–51 demonstrate the ability to make a one part adhesive using RTV-1 technology with excellent shelf life and that provides excellent adhesion to low surface energy substrates. The data in Table 9 shows that a single component adhesive can provide room temperature adhesion to low surface energy substrates with no surface pre-treatment and maintain excellent shelf life. Other additives such as tertiary amines can similarly extend shelf life. Shelf life means herein that the formulated adhesive maintained workability and demonstrated adhesion to the substrate after being allowed to sit undisturbed at room temperature in a moisture free container. Poor shelf life means the adhesive lost workability and the ability to adhere to a substrate. Workability means that the adhesive can be applied to the surface of a substrate by conventional means.

EXAMPLES 52–56

Examples 52–56 show that progressively adding surface treated fumed silica has a beneficial effect, up to a limit, on the measured adhesion of the present invention on a low energy surface substrate. All adhesives of the are formulated from 50 percent 44,000 MWT PDMS-OH, 5 percent (acryloxypropyl)trimethoxysiloxane, 1 percent DBTDA, 4 percent H-29, 2 percent IPDI, and MMA. Cabosil 530 Fumed Silica was added at varying level in the examples as detailed in Table 10 and these additions were made by substitution for MMA. The lap shear tests were performed at about 25° C. The results are compiled in Table 10. In all cases the substrate was PET and the failure mode was ca.

TABLE 10

| Example | % fumed silica | Lap shear psi (kPa) |
|---|---|---|
| 52 | 0 | 268 (1848) |
| 53 | 3 | 331 (2282) |
| 54 | 6 | 404 (2785) |
| 55 | 9 | 475 (3275) |
| 56 | 12 | 400 (2757) |

EXAMPLES 57–75

Examples 57–75 demonstrate the ability of adhesives of the present invention to obtain excellent adhesion to low surface energy substrates using a vinyl polymerization (addition) mechanism. The adhesive consists of 2600 Mn poly(dimethylsiloxane-co-methylhydrosiloxane), hydride terminated that is 26 percent by weight of methylhydrosiloxane and 1000 cP(centipoise) (1 Pa.s) divinyl terminated polydimethylsiloxane. The siloxane polymerization is catalyzed using 0.1 molar Pt (0) complexed in 1,3 divinyl 1,1,3,3 tetramethyl siloxane. The free radical polymerization is carried out using a tributylborane complex with isophorone diamine in a 1:1.1 equivalence ratio (H28⁻) and is initiated by reaction of the borane amine catalyst with isophoronediisocyanate. In many cases additional amine and isocyanate were added to the formulation to improve adhesive physical properties. In the formulations VS5500 glass balloons and Cabosil 530 fumed silica were added as fillers. In each case MMA was used as a monomer for the free radical polymerization. All weights are in grams. Part 1 comprised: VS 5500 glass beads; 8 parts of H28-, except Example 70 wherein it was present in 6 parts; PdV; IPDA; and PDMSH. In examples 75, 2 parts of Cabosil 530 fumed silica was also used. Part 2 of the adhesive compositions contained 11 parts of Cabosil 530 fumed silica, except Example 73 which contained 10 parts; IPDI; Pt(0) complex; methyl methacrylate. The formulations were designed to provide approximately 1:1 volumetric ratio. Lap shear tests were performed at room temperature on iPP and PET substrates. Table 1 shows the amounts of the components that varied in the examples and the results.

The Examples in Table 11 demonstrate that adhesives of the present invention obtain excellent adhesion to very low surface energy substrates at room temperature with no surface pre-treatment.

EXAMPLES 76–78 AND COMPARATIVE E

Examples 76–78 and Comparative Example E were performed to demonstrate that adhesives of the present invention provide low temperature performance not achievable by other adhesives. The flexible adhesives of the present invention are distinguished by processing very low ductile brittle transition temperatures, and providing flexible adhesion not possible using other adhesive compositions. All examples in Table 12 contain 44,000 MWT PDMS-OH, (acryloxypropyl)trimethylsiloxane, 1 percent DBTDA, 3 percent Cabosil, 4 percent H-29, 2 percent IPDI based on total adhesive weight with the balance made up with methyl methacrylate). The comparative acrylic resin formulation consists of 15 percent by weight 75,000 MWT PMMA co butyl acrylate (5 percent butyl content), 35 percent butyl acrylate and 50 percent 2-ethylhexy methacrylate. Adhesives were formulated with the above resin and catalyzed by 4 percent H-29 and initiated by 2 percent IPDI. Lap shear testing of the adhesives on PET substrates at room temperature was performed. The results are compiled in Table 12. All examples demonstrated cohesive adhesive failure to low surface energy substrates.

TABLE 12

| Example | % PDMSOH | % acryloxypropyl trimethoxysiloxane | Lap shear psi (kPa) | Ductile Brittle transition (C) |
|---|---|---|---|---|
| 76 | 50 | 5 | 373 (2572) | −48 |
| 77 | 60 | 5 | 234 (1613) | −48 |
| 78 | 70 | 5 | 155 (1068) | −50 |
| Comparative E | 0 | 0 | 5 (34) | <−50 broad |

TABLE 11

| | Part | | | | | | | | |
|---|---|---|---|---|---|---|---|---|---|
| Example | 1 VS 5500 | 1 PdV | 1 PDM SH | 1 IPDA | 2 IPDI | 2 Pt(0) cat | 2 MMA | Lap Shear iPP psi (kPa) | Lap Shear PET psi (kPa) |
| 57 | 15 | 44 | 4 | 2 | 6 | 1 | 82 | 59 (407) | 461 (3178) |
| 58 | 20 | 34 | 3 | 0 | 3 | 1 | 82 | 198 (1365) | 408 (2813) |
| 59 | 10 | 56 | 5 | 2 | 6 | 1 | 82 | 172 (1186) | 477 (3289) |
| 60 | 10 | 56 | 5 | 2 | 6 | 0.5 | 82.5 | 180 (1241) | 173 (1193) |
| 61 | 10 | 56 | 5 | 2 | 6 | 1.5 | 81.5 | 114 (786) | 477 (3286) |
| 62 | 10 | 56 | 5 | 2 | 6 | 2 | 81 | 202 (1393) | 511 (3523) |
| 63 | 10 | 54 | 5 | 4 | 8.5 | 1 | 79.5 | 339 (2337) | 197 (1358) |
| 64 | 12 | 52 | 3 | 2 | 6 | 1 | 82 | 117 (806) | 479 (3303) |
| 65 | 8 | 60 | 6 | 2 | 6 | 1 | 82 | 243 (1675) | 646 (4454) |
| 66 | 15 | 39 | 5 | 7 | 13 | 2 | 74 | 178 (1227) | 436 (3006) |
| 67 | 10 | 53 | 4.5 | 6 | 13 | 2 | 74 | 401 (2765) | 577 (3978) |
| 68 | 15 | 41 | 4.8 | 7 | 15 | 3 | 71 | 267 (1841) | 480 (3309) |
| 69 | 15 | 41 | 5 | 5.4 | 10 | 2 | 77 | 301 (2075) | 480 (3309) |
| 70 | 15 | 44 | 5 | 3 | 10 | 2 | 77 | 338 (2330) | 380 (2620) |
| 71 | 10 | 54 | 3 | 6 | 13 | 2 | 74 | 244 (1682) | 373 (2572) |
| 72 | 10 | 55 | 2 | 6 | 13 | 2 | 74 | 175 (1206) | 269 (1854) |
| 73 | 8 | 60 | 6 | 2 | 7 | 1 | 62 | 199 (1372) | 571 (3936) |
| 74 | 8 | 58 | 4 | 6 | 13 | 2 | 74 | 200 (1379) | 415 (2861) |
| 75 | 6 | 61 | 4 | 6 | 13 | 2 | 74 | 216 (1489) | 363 (2503) |

EXAMPLES 79–90 AND COMPARATIVE F AND G

Formulations of the present invention work very well on all tested low surface energy substrates with minimal sensitivity to substrate identity. As well as providing excellent flexibility to very low temperatures, the adhesives of the present invention furthermore work well at high temperature, consistent with their crosslinked chemical structure. Examples 80-91 demonstrate the utility of the invention in providing wide latitude in application. In Table 13 the formulations contain the indicated weight percent of 44,000 MWT PDMS-OH. In all cases the free radical polymerization was initiated with IPDI at 2 percent of the total adhesive weight and 4 percent of H29 and the balance of the adhesive is made up with MMA. All samples were crosslinked with 5 percent addition of acyloxypropyltrimethoxysiloxane. The formulations also contained 3 percent Cabosil TS-610 fumed silica and 2 percent DBTDA based on total adhesive weight. The adhesives were initiated using 4 percent of H29. Bond lines were in all cases 0.005 inches (0.127 mm) using glass beads to insure gap uniformity. The comparative samples were from a commercial Dow Corning silicone adhesive labeled DC-832. Lap shear testing of the adhesives on substrates listed at room temperature was performed. The results are compiled in Table 13. All failures were ca except the comparative samples, which were adhesive.

TABLE 13

| Example | PDMS-OH | % silica | Temp C | Substrate | Lap shear psi (kPa) |
|---|---|---|---|---|---|
| 79 | 40 | 3 | 25 | iPP | 380 (2620) |
| 80 | 40 | 3 | 25 | PET | 559 (3854) |
| 81 | 40 | 3 | 25 | Nylon | 340 (2344) |
| 82 | 45 | 3 | 25 | iPP | 342 (2358) |
| 83 | 45 | 3 | 25 | PET | 527 (3634) |
| 84 | 45 | 3 | 25 | Nylon | 415 (2861) |
| 85 | 50 | 3 | 25 | iPP | 371 (2558) |
| 86 | 50 | 3 | 25 | PET | 397 (2737) |
| 87 | 50 | 3 | 25 | Nylon | 309 (2130) |
| 88 | 60 | 6 | 90 | PET | 268 (1848) |
| 89 | 60 | 6 | 90 | e-coated steel | 262 (1806) |
| 90 | 60 | 6 | 150 | PET | 190 (1310) |
| Comp F | | | 90 | PET | 60 (413) |
| Comp G | | | 150 | PET | 59 (406) |

EXAMPLE 91

Example 91 illustrates the ability of the present invention to incorporate further functionality by co-polymerizing a thermosetting minor phase. A minor epoxy phase was incorporated into the PDMS and acrylic phases. The adhesive is 30 percent 44,000 MWT PDMSOH, 16 percent DER331, 3 percent SnCl$_4$ (epoxy catalyst), 3 percent Cabosil TS-530, 3 percent IPDI, 4 percent H-29, 31 percent MMA, 3 percent glycidyl methacrylate, 3 percent (3-glycidoxypropyl)trimethoxysiloxane, and 2 percent DBTDA. PET substrates were adhered in a lap shear configuration using the formulation and allowed to cure at room temperature for 48 hours. The sample was subsequently tested and gave a lap shear strength of 362 psi (2496 kPa) with a cohesive adhesive failure mode. This result shows that it is possible to incorporate an epoxy phase in conjunction with the acrylic, PDMS, and polyurea phases seen in the previous examples.

What is claimed is:

1. A complex comprising a borane, having three ligands selected separately in each occurrence from alkyl and cycloalkyl, and an amino siloxane.

2. A complex according to claim 1 wherein the complex corresponds to one of the formulas

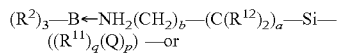

or

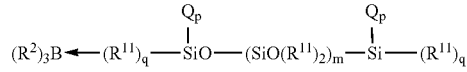

wherein
B represents boron;
R$^2$ is separately in each occurrence C$_{1-10}$ alkyl, C$_{3-10}$ cycloalkyl, or two or more of R$^2$ may combine to form a cycloaliphatic ring;
Q is a hydrolyzable moiety;
R$^{11}$ is independently in each occurrence hydrogen, alkyl, alkoxy, alkenyl, alkyl amino or corresponds to the formula $((CR^{14}H)_rO)_n$—$(NR^4)$—$(CH_2)_o$—$NH_2$ with the proviso that at least (R$^{11}$)' is a primary amine leave this as is;
R$^{12}$ is independently in each occurrence hydrogen, alkyl, aryl, alkoxy, and may further contain one or more primary, secondary or tertiary amines;
R$^{14}$ is separately in each occurrence hydrogen or alkyl;
R$^4$ is hydrogen, C$_{1-10}$ alkyl, C$_{6-10}$ aryl or C$_{7-10}$ alkaryl;
a is a number of form 1 to 10;
b is a number of from 0 to 1;
m is separately in each occurrence a whole number of 1 or greater;
p is separately in each occurrence a number of from 1 to 3;
q is separately in each occurrence an integer from 1 to 2 wherein the sum of p and q on each silicon atom is 3;
n is separately in each occurrence an integer of about 4 to about 400;
o is separately in each occurrence an integer of about 1 to about 9; and
r is separately in each occurrence an integer of 2 or 4.

3. Complexes according to claim 2 wherein
R$^2$ is separately in each occurrence C$_{1-4}$ alkyl,
Q is a hydrogen atom, halogen atom, alkoxy group, acyloxy group, heteroaromatic group, amino group, amido group, amino-oxy group, mercapto group or alkenyloxy group;
R$^{11}$ is independently in each occurrence C$_{1-20}$ alkyl, C$_{2-20}$ vinyl terminated alkenyl or corresponds to the formula

R$^{12}$ is independently in each occurrence hydrogen, C$_{1-20}$ alkyl, C$_{6-20}$ aryl, or C$_{1-20}$ alkoxy;
R$^{14}$ is separately in each occurrence hydrogen or C$_{1-6}$ alkyl;
R$^4$ is hydrogen or a C$_{1-10}$ alkyl;
a is a number of from 2 to 6;
b is 1;
m is separately in each occurrence a whole number of 1 or greater;
p is separately in each occurrence a number of from 2 or 3;
q is separately in each occurrence an integer from 0 or 1;
n is separately in each occurrence an integer of about 10 to about 100.

4. Complexes according to claim 3 wherein
R$^2$ is C$_{2-4}$ alkyl;
Q is independently in each occurrence an alkoxy group;
R$^{11}$ is independently in each occurrence C$_{1-4}$ alkyl, C$_{2-8}$ alkenyl, or corresponds to the formula $((CR^{14}H)_rO)_n$—$(NR^4)$—$(CH_2)_o$—$NH_2$.

$R^{12}$ is independently in each occurrence $C_{1-4}$ alkyl, $C_{6-12}$ or $C_{1-4}$ alkoxy;

$R^{14}$ is independently in each occurrence hydrogen, methyl or ethyl; and m is selected such that the molecular weight of the amine compound is between about 250 and 100,000 daltons.

5. An amine organoborane complex corresponding to the formula

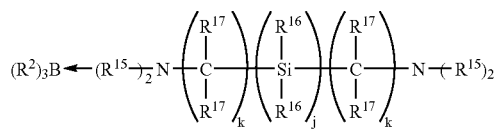

wherein

B is boron;

$R^2$ is separately in each occurrence $C_{1-10}$ alkyl, $C_{3-10}$ cycloalkyl, or two or more of $R^2$ may combine to form a cycloaliphatic ring;

$R^{15}$ is separately in each occurrence hydrogen, $C_{1-20}$ alkyl or $C_{1-20}$ aminoalkyl;

$R^{16}$ is separately in each occurrence hydrogen, alkyl, alkenyl, acyl, alkaryl or aralkyl having up to 20 carbon atoms;

$R^{17}$ is independently in each occurrence hydrogen, fluorine, $C_{1-20}$ hydrocarbyl or $C_{1-20}$ fluorocarbyl; and j and k are whole numbers selected such that the molecular weight of the amine compound is between 250 and 10,000.

6. Complexes according to claim 5 wherein $R^2$ is separately in each occurrence $C_{1-4}$ alkyl;

$R^{15}$ is separately in each occurrence hydrogen or amino alkyl;

$R^{16}$ is separately in each occurrence hydrogen, alkyl, alkenyl acyl, alkaryl, aralkyl having up to 8 carbon atoms;

$R^{17}$ is separately in each occurrence hydrogen, fluorine, $C_{1-8}$ alkyl or $C_{1-8}$ fluoroalkyl;

j is separately in each occurrence a number of 20 or greater; and k is independently in each occurrence number of about 1 to about 8.

* * * * *

UNITED STATES PATENT AND TRADEMARK OFFICE
CERTIFICATE OF CORRECTION

| | | |
|---|---|---|
| PATENT NO. | : 7,157,399 B2 | Page 1 of 1 |
| APPLICATION NO. | : 10/864668 | |
| DATED | : January 2, 2007 | |
| INVENTOR(S) | : Mark Sonnenschein et al. | |

It is certified that error appears in the above-identified patent and that said Letters Patent is hereby corrected as shown below:

In Column 36, line 24, "form" should read -- from --.

Signed and Sealed this

Tenth Day of April, 2007

JON W. DUDAS
*Director of the United States Patent and Trademark Office*